(12) United States Patent
Kubota et al.

(10) Patent No.: US 12,546,867 B2
(45) Date of Patent: Feb. 10, 2026

(54) LIGHT RECEIVING DEVICE AND DISTANCE MEASURING DEVICE

(71) Applicant: KABUSHIKI KAISHA TOSHIBA, Tokyo (JP)

(72) Inventors: Hiroshi Kubota, Yamato Kanagawa (JP); Nobu Matsumoto, Ebina Kanagawa (JP); Katsuyuki Kimura, Kamakura Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 297 days.

(21) Appl. No.: 17/900,069

(22) Filed: Aug. 31, 2022

(65) Prior Publication Data

US 2023/0288543 A1 Sep. 14, 2023

(30) Foreign Application Priority Data

Mar. 11, 2022 (JP) ................. 2022-038318

(51) Int. Cl.
*G01S 7/4863* (2020.01)
*G01S 7/4865* (2020.01)
*G01S 17/931* (2020.01)
*H10F 77/00* (2025.01)

(52) U.S. Cl.
CPC .......... *G01S 7/4863* (2013.01); *G01S 7/4865* (2013.01); *G01S 17/931* (2020.01); *H10F 77/959* (2025.01)

(58) Field of Classification Search
CPC .... G01S 7/4863; G01S 7/4865; G01S 17/931; G01S 7/4868; G01S 7/497; G01S 17/10; G01S 17/42; H01L 31/02027
See application file for complete search history.

(56) References Cited

U.S. PATENT DOCUMENTS

| | | | |
|---|---|---|---|
| 9,985,071 B2 | 5/2018 | Irish et al. | |
| 11,378,660 B2 | 7/2022 | Beuschel et al. | |
| 2018/0180473 A1* | 6/2018 | Clemens | G01S 7/497 |
| 2019/0041517 A1 | 2/2019 | Ichiyanagi | |
| 2019/0154815 A1* | 5/2019 | Oohata | G01S 17/10 |
| 2020/0292675 A1* | 9/2020 | Kubota | G01S 7/4863 |
| 2021/0041540 A1* | 2/2021 | Shinozuka | H10F 77/959 |
| 2021/0341591 A1* | 11/2021 | Nishino | H04N 25/60 |
| 2022/0397650 A1* | 12/2022 | Kubota | G01S 17/10 |
| 2023/0048083 A1* | 2/2023 | Mahara | G01S 7/497 |

(Continued)

FOREIGN PATENT DOCUMENTS

| | | | | |
|---|---|---|---|---|
| EP | 3839556 B1 * | 3/2022 | | G01S 17/10 |
| JP | 2000-323747 A | 11/2000 | | |

(Continued)

OTHER PUBLICATIONS

Japan Patent Office, Office Action in JP App. No. 2022-038318, 2 pages, and machine translation, 4 pages (Nov. 5, 2024).

*Primary Examiner* — Tarifur R Chowdhury
*Assistant Examiner* — Kemaya Nguyen
(74) *Attorney, Agent, or Firm* — Finnegan, Henderson, Farabow, Garrett & Dunner, LLP

(57) ABSTRACT

According to the present embodiment, a light receiving device includes a plurality of pixels. Each of the pixels includes a photoelectric conversion element configured to be able to detect incidence of a photon and a power supply portion configured to change an applied voltage applied across both ends of the photoelectric conversion element.

15 Claims, 17 Drawing Sheets

(56) References Cited

U.S. PATENT DOCUMENTS

2023/0124216 A1     4/2023   Miyanohara et al.
2023/0358534 A1*   11/2023   Inoue ........................ G01C 3/06

FOREIGN PATENT DOCUMENTS

| | | |
|---|---|---|
| JP | 2012-68066 A | 4/2012 |
| JP | 2014-59302 A | 4/2014 |
| JP | 2016-14535 A | 1/2016 |
| JP | 2019-28013 A | 2/2019 |
| JP | 2019-518200 A | 6/2019 |
| JP | 2019-158806 A | 9/2019 |
| JP | 2021-507260 A | 2/2021 |
| WO | WO 2021/192460 A1 | 9/2021 |

* cited by examiner

| FIXED VOLTAGE | REVERSE BIAS | DISTANCE MEASURING PORTION | LIGHT RECEIVER APPLIED VOLTAGE |
|---|---|---|---|
| MEASUREMENT PIXEL | -30V | 5V | 35V |
| NON-MEASUREMENT PIXEL | -10V | 0V | 10V |
FIG. 8
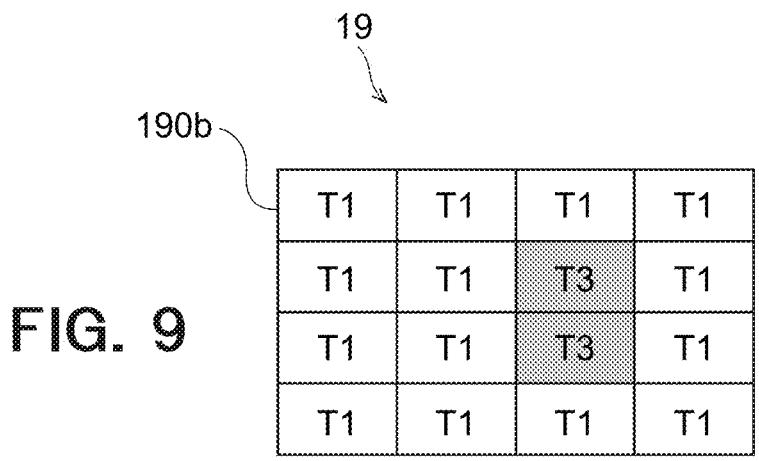
FIG. 9
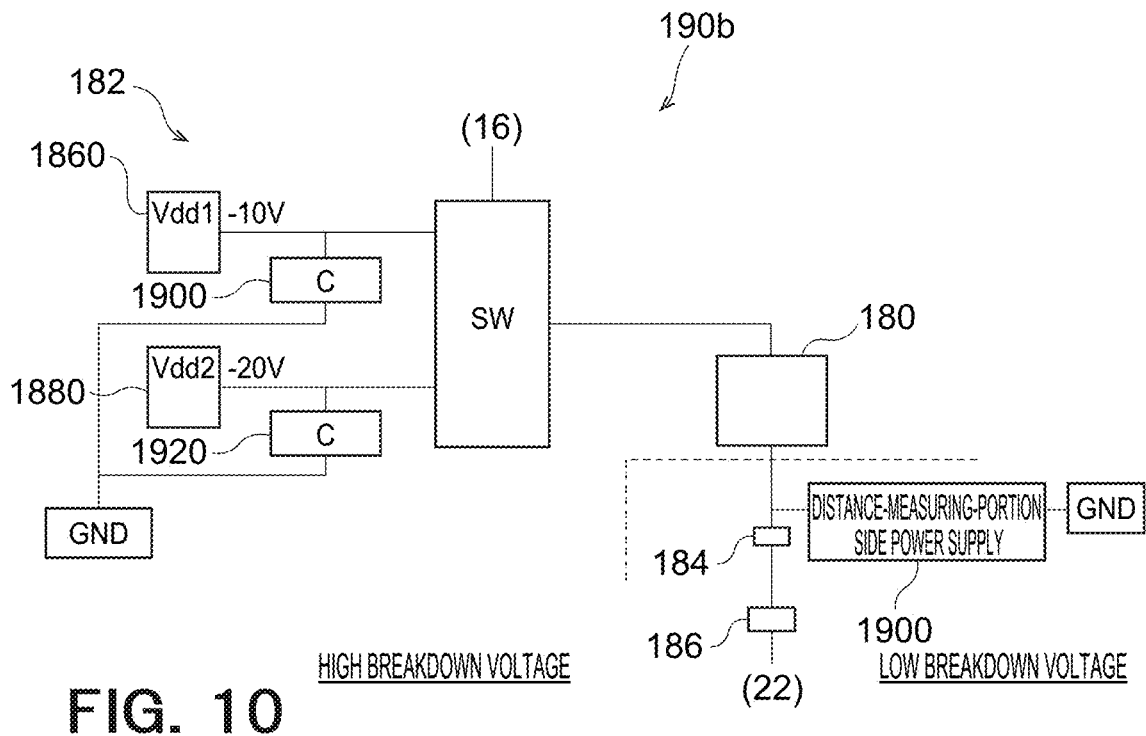
FIG. 10

FIXED VOLTAGE
| | REVERSE BIAS | DISTANCE MEASURING PORTION | LIGHT RECEIVER APPLIED VOLTAGE |
|---|---|---|---|
| MEASUREMENT PIXEL | -30V | 5V | 35V |
| NON-MEASUREMENT PIXEL | -30V | 0V | 30V |
FIG. 11
FIXED VOLTAGE
| | REVERSE BIAS | DISTANCE MEASURING PORTION | LIGHT RECEIVER APPLIED VOLTAGE |
|---|---|---|---|
| MEASUREMENT PIXEL | -30V | 5V | 35V |
| PIXEL FOR WHICH MEASUREMENT IS TO BE PERFORMED NEXT | -30V | 0V | 30V |
| NON-MEASUREMENT PIXEL | -10V | 0V | 10V |
FIG. 12
FIG. 13
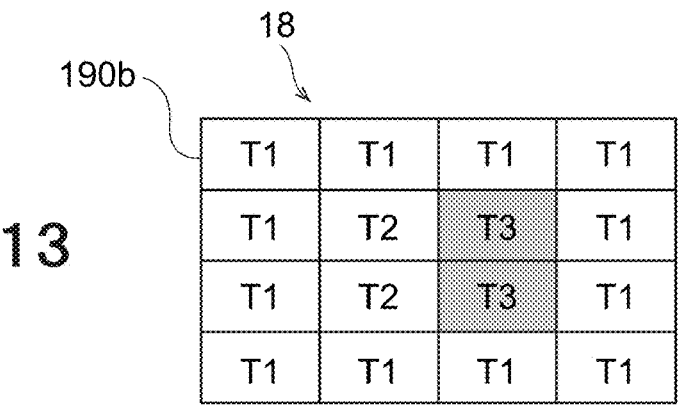
FIG. 14
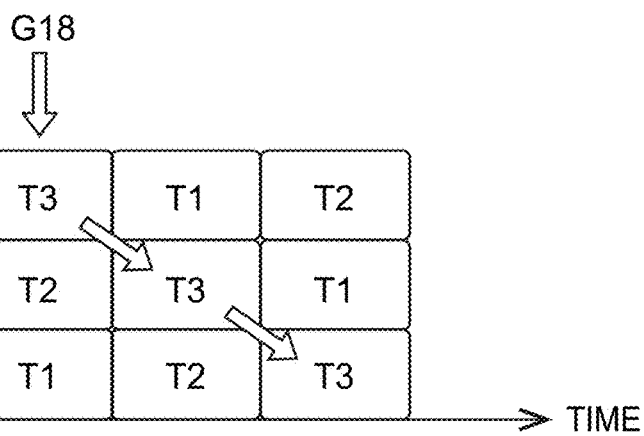

LIGHT RECEIVING DEVICE AND DISTANCE MEASURING DEVICE

CROSS-REFERENCE TO RELATED APPLICATIONS

This application is based upon and claims the benefit of priority from the prior Japanese Patent Application No. 2022-038318, filed on Mar. 11, 2022 the entire contents of which are incorporated herein by reference.

FIELD

Embodiments of the present invention relate to a light receiving device and a distance measuring device.

BACKGROUND

There is known a distance measuring device called LIDAR (Light Detection and Ranging). This distance measuring device irradiates a measurement object with laser light and converts the intensity of reflected light reflected from the measurement object to a time-series measurement signal based on the output of a light receiving device including a plurality of photodiodes such as avalanche photodiodes (APDs). Accordingly, the distance to the measurement object is measured based on a time difference between a time of emission of the laser light and a time at which the reflected light is received by the light receiving device.

However, the light receiving device steadily receives background light such as sunlight, and performs multiplication also for the background light. Therefore, a photodiode that receives only the background light may be also used for multiplication of unnecessary light such as the background light. As a result, there is a risk of causing increase of power consumption of the light receiving device.

BRIEF DESCRIPTION OF THE DRAWINGS

FIG. 8 is a table representing an example of a reverse bias voltage, a voltage of a distance-measuring-portion side power supply, and a light receiver applied voltage applied across both ends of the PD;

FIG. 9 is a diagram illustrating an example of distribution of measurement pixels and non-measurement pixels in the PDs arranged two-dimensionally;

FIG. 10 is a block diagram illustrating a more detailed configuration example of a pixel;

FIG. 11 is a table representing an operation example of a power-supply voltage in a comparative example;

FIG. 12 is a table representing an operation example of the power-supply voltage including a preparing operation by a controller;

FIG. 13 is a diagram illustrating an example of distribution of measurement pixels, preparing pixels, and non-measurement pixels in PDs;

FIG. 14 is a diagram illustrating a time change of driving states of pixels in three columns;

DETAILED DESCRIPTION

Figure 1:
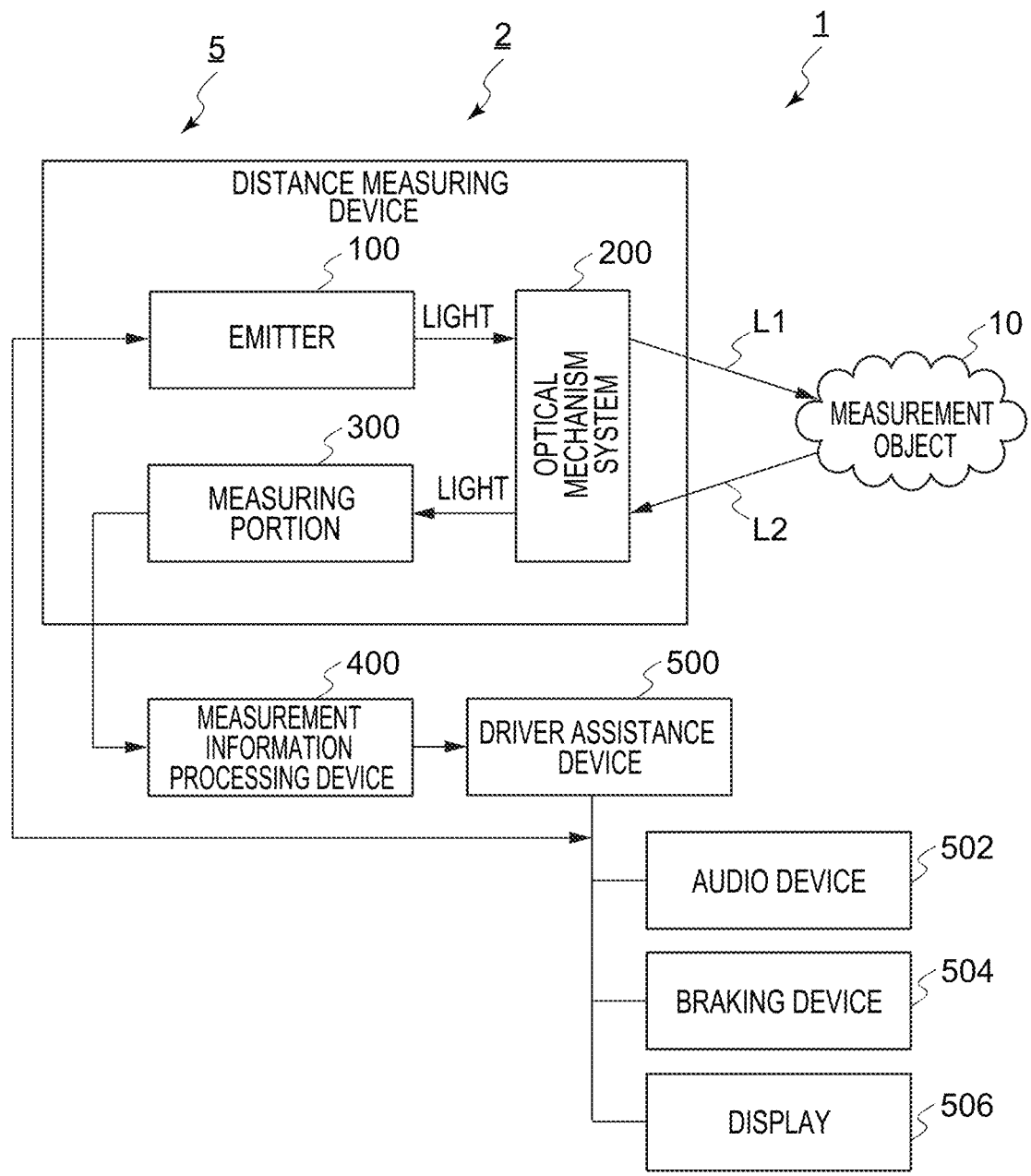
FIG. 1 is a diagram illustrating a schematic overall configuration of a driver assistance system according to the present embodiment.

According to the present embodiment, a light receiving device includes a plurality of pixels, Each of the pixels includes a photoelectric conversion element configured to be able to detect incidence of a photon and a power supply portion configured to change an applied voltage applied across both ends of the photoelectric conversion element.

The light receiving device and a distance measuring device according to embodiments of the present invention will now be explained in detail with reference to the drawings. The embodiments described below are only examples of the embodiments of the present invention and the present invention is not limited to the embodiments. In the drawings referred to in the embodiments, same parts or parts having identical functions are denoted by like or similar reference characters and there is a case where redundant explanations thereof are omitted. Further, there are cases where dimensional ratios of the parts in the drawings are different from those of actual products and some part of configurations is omitted from the drawings.

First Embodiment

FIG. 1 illustrates a schematic overall configuration of a driver assistance system according to the present embodiment. As illustrated in FIG. 1, a driver assistance system 1 assists a driver based on a range image. The driver assistance system 1 is configured to include a distance measuring system 2, a driver assistance device 500, an audio device 502, a breaking device 504, and a display 506, The distance measuring system 2 generates a range image and a speed image of a measurement object 10 and includes a distance measuring device 5 and a measurement information processing device 400.

The distance measuring device 5 measures a distance to the measurement object 10 using a scanning method and a TOF (Time Of Flight) method. More specifically, the distance measuring device 5 is configured to include an emitter 100, an optical mechanism system 200, and a measuring portion 300.

The emitter 100 intermittently emits laser light L1. The optical mechanism system 200 irradiates the measurement object 10 with the laser light L1 emitted by the emitter 100 and causes reflected light L2 of the laser light L1 reflected on the measurement object 10 to be incident on the measuring portion 300, Here, laser light means light in which waves have the same phase and the same frequency. The reflected light L2 means light traveling in a predetermined direction in scattered light of the laser light L1.

The measuring portion 300 measures the distance to the measurement object 10 based on the reflected light L2 received through the optical mechanism system 200. That is, this measuring portion 300 measures the distance to the measurement object 10 based on a time difference between a time at which the emitter 100 irradiates the measurement object 10 with the laser light L1 and a time at which the reflected light L2 is measured. The measurement information processing device 400 performs noise reduction processing and outputs range image data based on distances to a plurality of measurement points on the measurement object 10. A part or the whole of the measurement information processing device 400 may be incorporated in the housing of the distance measuring device 5.

The driver assistance device 500 assists a driver in driving a vehicle in accordance with an output signal of the measurement information processing device 400. The audio device 502, the braking device 504, and the display 506, for example, are connected to the driver assistance device 500.

The audio device 502 is, for example, a speaker and is arranged at such a position that the driver in the driver's seat in the vehicle can hear a sound. The driver assistance device 500 causes, for example, the audio device 502 to generate a voice saying "5 meters to an object" based on the output signal of the measurement information processing device 400. Accordingly, it is possible to call the driver's attention by causing the driver to hear the voice, for example, also in a case where the driver becomes less attentive.

The braking device 504 is, for example, an auxiliary brake. The driver assistance device 500 causes the braking device 504 to brake the vehicle, for example, when the object approaches the vehicle to a predetermined distance, for example, 3 meters based on the output signal of the measurement information processing device 400.

The display 506 is, for example, a liquid crystal monitor. The driver assistance device 500 displays an image on the display 506 based on the output signal of the measurement information processing device 400. Accordingly, it is possible to understand external information more accurately by referring to the image displayed on the display 506, for example, even in backlight.

Figure 2:
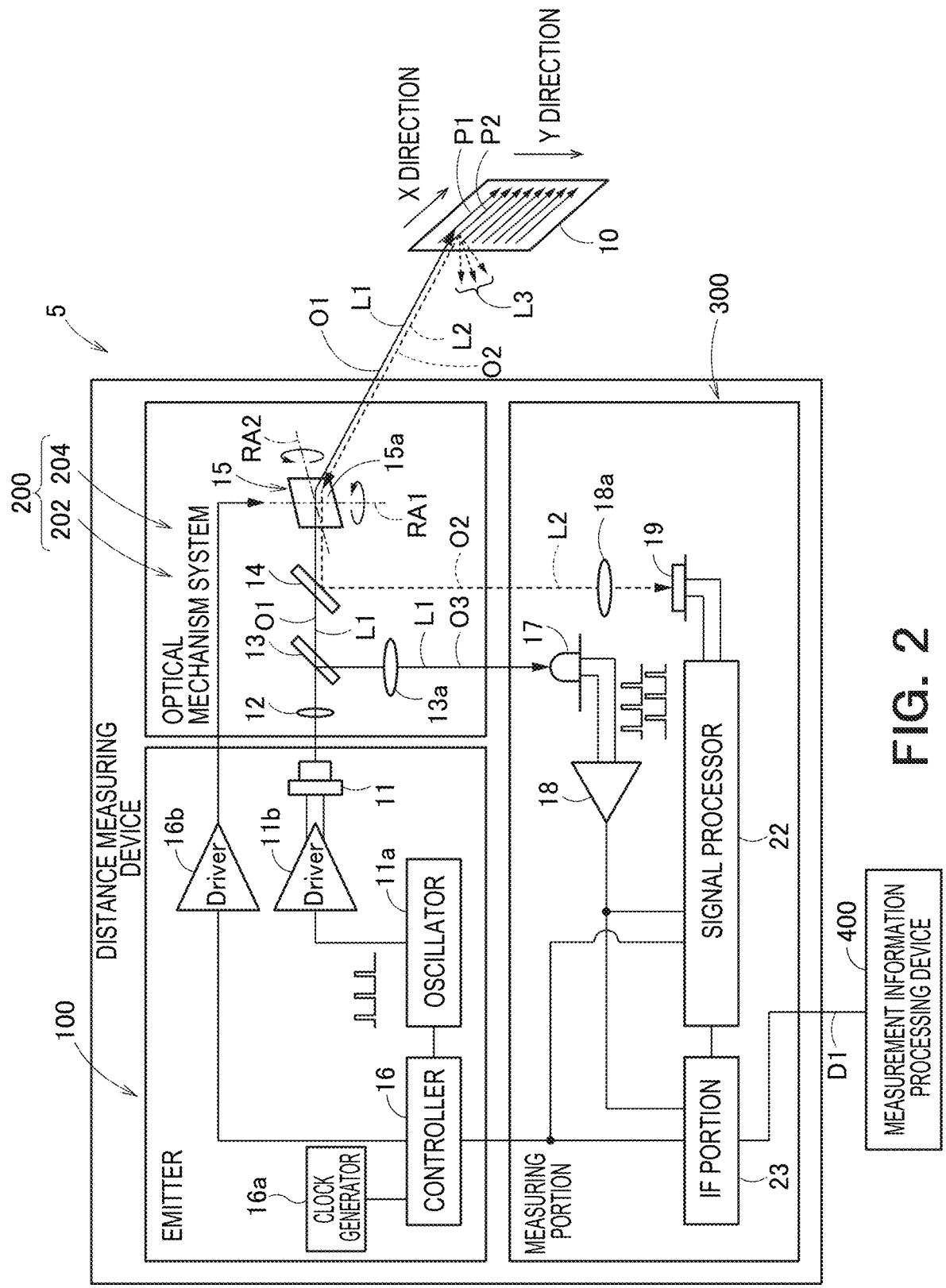
FIG. 2 is a diagram illustrating a configuration example of a distance measuring device according to a first embodiment.

Next, a more detailed configuration example of the emitter 100, the optical mechanism system 200, and the measuring portion 300 of the distance measuring device 5 according to the present embodiment is described with reference to FIG. 2. FIG. 2 is a diagram illustrating a configuration example of the distance measuring device 5 according to the first embodiment. As illustrated in FIG. 2, the distance measuring device is configured to include the emitter 100, the optical mechanism system 200, the measuring portion 300, and the measurement information processing device 400. Here, light scattered in a predetermined direction in scattered light L3 is called the reflected light L2. The block diagram in FIG. 2 illustrates an example of signals, and the order and the wiring are not limited thereto.

The emitter 100 includes a light source 11, an oscillator 11a, a first driving circuit 11b, a controller 16, a clock generator 16a, and a second driving circuit 16b.

The optical mechanism system 200 includes an irradiation optical system 202 and a light-receiving optical system 204. The irradiation optical system 202 includes a lens 12, a first optical element 13, a lens 13a, and a mirror (a reflecting device) 15.

The light-receiving optical system 204 includes a second optical element 14 and the mirror 15. That is, the irradiation optical system 202 and the light-receiving optical system 204 share the mirror 15.

The measuring portion 300 includes a photodetector 17, a lens 18a, a first amplifier 18, a light receiving device 19, and a first distance measuring portion 150, Although the mirror 15 is used here as an existing method of performing scanning with light, there is known a method of rotating the distance measuring device 5 (hereinafter, "rotating method") other than the method using the mirror 15. Another existing scanning method is an OPA (Optical Phased array) method. Since the present embodiment does not depend on how to perform scanning with light, scanning with light may be performed by the rotating method or the OPA method.

The oscillator 11a of the emitter 100 generates a pulse signal on the basis of control by the controller 16, The first driving circuit lib drives the light source 11 based on the pulse signal generated by the oscillator 11a. The light source 11 is a laser light source such as a laser diode, and intermittently emits the laser light L1 by being driven by the first driving circuit 11b.

Figure 3:
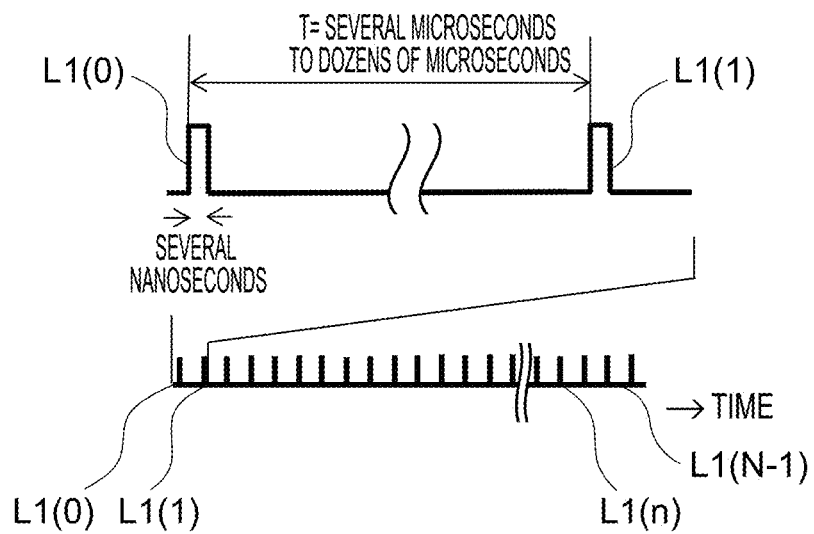
FIG. 3 is a diagram schematically illustrating an emission pattern of a light source in one frame.

Next, an emission pattern of the light source 11 in one frame is described with reference to FIG. 3. Here, a frame means a combination of emission of the laser light L1 that is repeated periodically. FIG. 3 is a diagram schematically illustrating an emission pattern of the light source 11 in one frame. In FIG. 3, the horizontal axis represents time, and vertical lines represent timings of emission by the light source 11. The upper diagram is an enlarged view of a portion in the lower diagram. As illustrated in FIG. 3, the light source 11 intermittently and repeatedly emits laser light L1(n) (0≤n<N) at an interval of T that is several microseconds to dozens of microseconds, for example. In this description, the laser light L1 emitted at the n-th emission is represented as L1(n). N represents the number of times of emission of the laser light L1(n) emitted for measurement of the measurement object 10 in one frame. After emission in one frame is finished, emission in the next frame is started from L1(0).

As illustrated in FIG. 2, the light source 11, the lens 12, the first optical element 13, the second optical element 14, and the mirror 15 are arranged on an optical axis O1 of the irradiation optical system 202 in that order. Accordingly, the lens 12 collimates the laser light L1 intermittently emitted and directs it to the first optical element 13.

The first optical element 13 allows the laser light L1 to pass therethrough and makes a portion of the laser light L1 incident on the photodetector 17 along an optical axis O3. The first optical element 13 is, for example, a beam splitter. Although the first optical element 13 is included in the present embodiment, the configuration of the optical mechanism system is not limited thereto. For example, a configuration not including the first optical element 13 may be employed.

The second optical element 14 allows the laser light L1 that has passed through the first optical element 13 to pass therethrough and makes that laser light L1 incident on the mirror 15. The second optical element 14 is, for example, a half mirror.

The mirror 15 has a reflection surface 15a that reflects the laser light L1 intermittently emitted from the light source 11. The reflection surface 15a can be turned about each of two turning axis lines RA1 and RA2 crossing each other, for example. Accordingly, the mirror 15 changes the direction of emission of the laser light L1 periodically.

The controller 16 has, for example, a CPU (Central Processing Unit) and controls the second driving circuit 16b in accordance with a dock signal supplied from the dock generator 16a in such a manner that a tilt angle of the reflection surface 15a is continuously changed. That is, the clock generator 16a generates the clock signal and supplies it to the controller 16, for example.

The second driving circuit 16b drives the mirror 15 in accordance with a driving signal supplied from the controller 16. That is, the controller 16 controls the second driving circuit 16b to change the direction of emission of the laser light L1.

Figure 4:
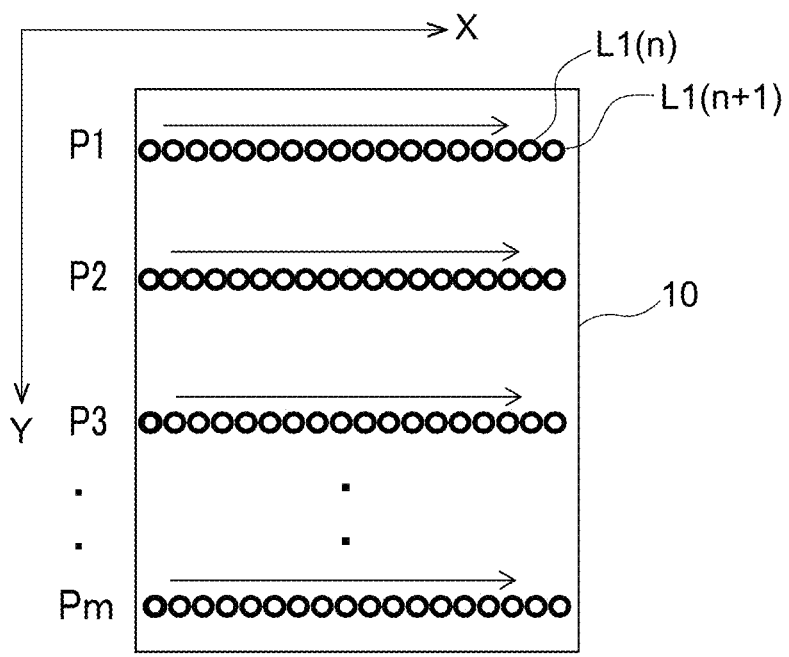
FIG. 4 is an enlarged schematic diagram illustrating positions on a measurement object irradiated with laser light in one frame.

Next, the direction of emission of the laser light L1 in one frame is described with reference to FIG. 4, FIG. 4 is an enlarged schematic diagram illustrating positions irradiated with the laser light L1 on the measurement object 10 in one frame. As illustrated in FIG. 4, the reflection surface 15a (FIG. 2) changes the direction of emission for each laser light L1 to emit it onto discrete positions arranged on a corresponding one of straight paths P1 to Pm (m is a natural number of 2 or more) on the measurement object 10 which are substantially parallel to each other. In this manner, the distance measuring device 5 according to the present embodiment performs emission to the measurement object 10 once while changing an emission direction O(n) (0≤n<N) of the laser light L1(n) (0≤n<N) for each frame f(m) (0≤m<M). Here, the emission direction of the laser light L1(n) is described as O(n). That is, in the distance measuring device 5 according to the present embodiment, the laser light L1(n) is emitted once to the emission direction O(n). Since the emission direction O(n) (0≤n<N) is the same between frames, the emission direction O(n) (0≤n<N) in the m-th frame and the emission direction O(n) (0≤n<N) in the (m−1)th frame match each other. As described above, the laser light L1(n) according to the present embodiment may be sequentially emitted to points one by one as illustrated in FIG. 4. However, the method of emission of the laser light L1(n) is not limited thereto and the laser light L1(n) may be emitted to a plurality of points simultaneously.

As illustrated in FIG. 2, the reflection surface 15a of the mirror 15, the second optical element 14, the lens 18a, and the light receiving device 19 are arranged on an optical axis O2 of the light-receiving optical system 204 in the order of incidence of the reflected light L2. Here, the optical axis O1 is a focal axis of the lens 12 which passes through the center of the lens 12. The optical axis O2 is a focal axis of the lens 18a which passes through the center of the lens 18a.

The reflection surface 15a makes the reflected light L2 in the scattered light L3 scattered from the measurement object 10, which travels along the optical axis O2, incident on the second optical element 14. The second optical element 14 changes the traveling direction of the reflected light L2 reflected by the reflection surface 15a and makes it incident on the lens 18a of the measuring portion 300 along the optical axis O2. The lens 18a causes the reflected light L2 incident thereon along the optical axis O2 to converge onto the light receiving device 19.

Meanwhile, the traveling direction of light in the scattered light L3, which is reflected to a direction different from the direction of the laser light L1, is shifted from the optical axis O2 of the light-receiving optical system 204. Therefore, the light in the scattered light L3, which is reflected to the direction different from the optical axis O2, is incident on a position shifted from an incident surface of the light receiving device 19 even when it is incident within the light-receiving optical system 204. On the other hand, ambient light, such as sunlight, scattered by a certain object includes light traveling along the optical axis O2, and such light is incident on the incident surface of the light receiving device 19 at random to become random noise.

Although optical paths of the laser light L1 and the reflected light L2 are illustrated as being separated from each other in FIG. 2 for the sake of clarity, these paths may overlap each other actually. An optical path of the center of the beam of the laser light L1 is illustrated as the optical axis O1. Similarly, an optical path of the center of the beam of the reflected light L2 is illustrated as the optical axis O2.

Figure 5A:
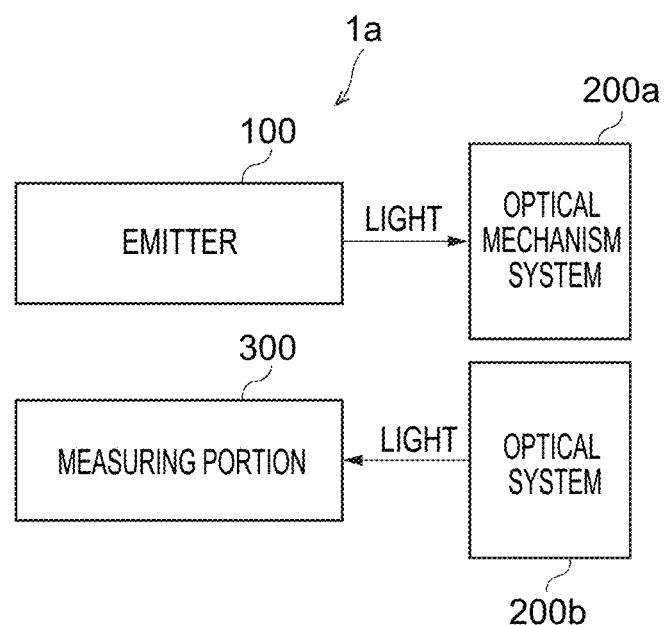
FIG. 5A is a diagram illustrating a configuration example of a measuring portion that performs measurement through an optical system different from an optical mechanism system.

FIG. 5A is a diagram illustrating a configuration example of the measuring portion 300 that performs measurement through an optical system 200b different from an optical mechanism system 200a, The optical mechanism system 200a has a configuration equivalent to the emitter 100 side portion of the optical mechanism system 200 and includes, for example, the lens 12, the first optical element 13, the lens 13a, and the mirror (the reflecting device) 15. Meanwhile, the optical system 200b is, for example, an optical system including a plurality of objective lenses. Optical systems independent of each other may be provided on the emitter 100 side and the measuring portion 300 side in this manner.

Figure 5B:
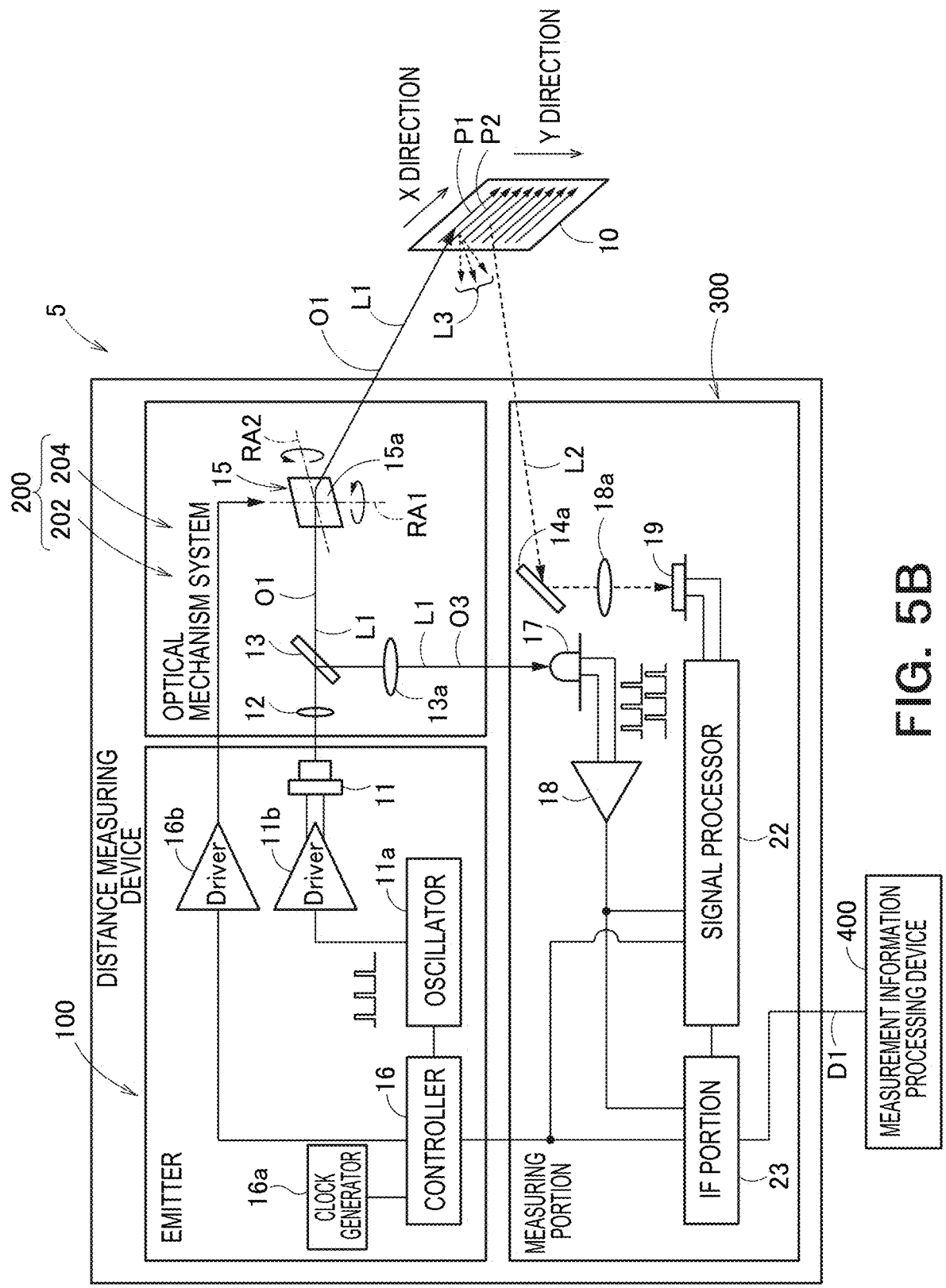
FIG. 5B is a diagram illustrating a configuration example of a distance measuring device that performs measurement through a system different from the optical mechanism system illustrated in FIG. 2.

FIG. 5B is a diagram illustrating a configuration example of the distance measuring device 5 that performs measurement through a system different from the optical mechanism system 200. As illustrated in FIG. 5B, this configuration example of the distance measuring device 5 is different from that illustrated in FIG. 2 in that the light L2 returning from the measurement object 10 is captured by a mirror 14a and the lens 18a.

Figure 6:
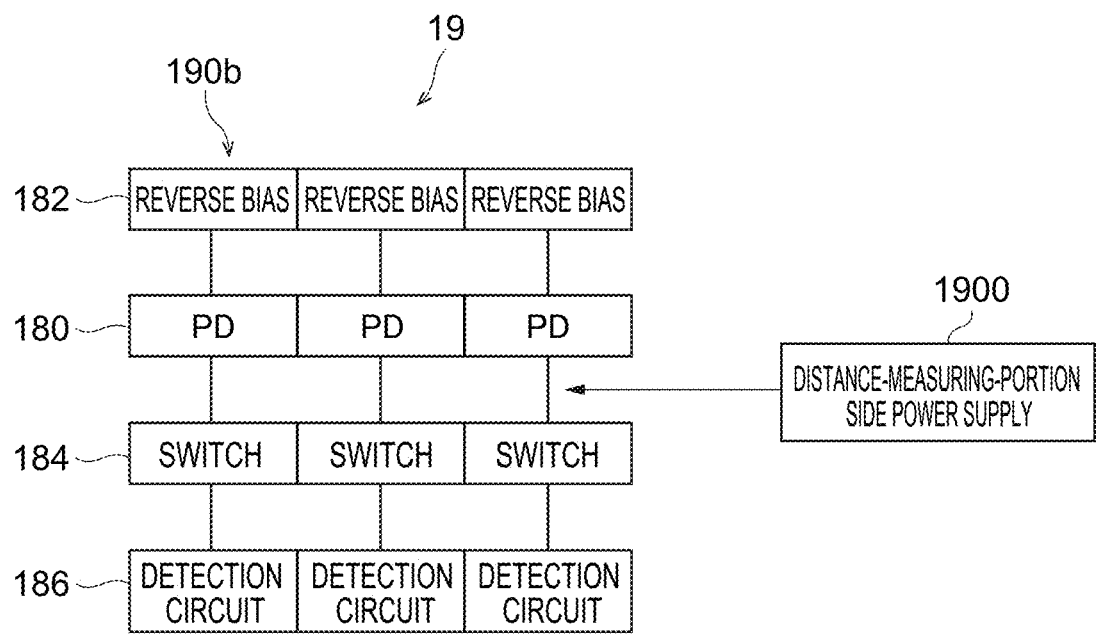
FIG. 6 is a block diagram illustrating a configuration example of a light receiving device.

FIG. 6 is a block diagram illustrating a configuration example of the light receiving device 19. As illustrated in FIG. 6, the light receiving device 19 has a plurality of pixels 1901). Each pixel 190*b* includes a photodiode (PD) 180, a reverse bias power supply 182, a switch 184, and a detection circuit 186. The PD 180, the reverse bias power supply 182, the switches 184, and the detection circuit 186 are connected in series. That is, the reverse bias power supply 182 is connected to one end of the PD 180 on an anode side (a lower potential side), and one end of the switch 184 is connected to the other end of the PD 180 on a cathode side. Further, a voltage of a distance-measuring-portion side power supply 1900 is applied to the other end of the PD 180 on the cathode side. The reverse bias power supply 182 and the distance-measuring-portion side power supply 1900 according to the present embodiment correspond to a first power supply and a second power supply, respectively. The photodiode (PD) 180 may be simply written as the PD 180 in the following descriptions.

The PD 180 is, for example, a photoelectric conversion element and converts a single photon to an electrical signal. This photoelectric conversion element is configured by, for example, a Geiger-mode avalanche photodiode (APD: Avalanche Photodiode). The avalanche photodiode is a light receiving element with the light-receiving sensitivity increased by using a phenomenon called avalanche multiplication. The avalanche photodiode used in the Geiger mode is generally used together with a quenching element and is called a single-photon avalanche photodiode (SPAD: Single-Photon Avalanche Diode), That is, the avalanche photodiode is a diode in which the light-receiving sensitivity is increased by avalanche breakdown caused with a specific reverse voltage. The avalanche photodiode using silicon as its material is sensitive to light having a wavelength of 200 nm to 1000 nm, for example.

The PD 180 is not limited to the avalanche photodiode. For example, the PD 180 may be configured by a photomultiplier (SiPM: Silicon Photomultiplier). The photomultiplier is a photon counting device in which a plurality of single-photon avalanche photodiodes (SPADs) are integrated. Further, the PD 180 may be configured by arranging a plurality of materials such as photodiodes, avalanche diodes (ABDs: avalanche breakdown diodes), or photomultipliers using a compound semiconductor as its material. The photodiode is configured by a semiconductor serving as a photodetector, for example.

The reverse bias power supply 182 switches a plurality of reverse bias voltages to apply one of the voltages to one end of the PD 180, Meanwhile, the distance-measuring-portion side power supply 1900 switches a plurality of voltages to apply one of the voltages to the other end of the PD 180. The switch 184 is, for example, a transistor. The switch 184 electrically connects or disconnects the PD 180 and the detection circuit 186 to and from each other.

The detection circuit 186 converts an electrical signal output from the PD 180 to a time-series luminance signal at a predetermined sampling interval. This detection circuit 186 includes, for example, an amplifier and an analog-to-digital converter. For example, a transimpedance amplifier (TIA) that converts the electrical signal of the PD 180 to a voltage signal and amplifies the voltage signal is used as the amplifier. The analog-to-digital converter (ADC) samples a measurement signal amplified by the amplifier at a plurality of sampling timings to convert it to a digital time-series luminance signal corresponding to the emission direction of the laser light L1. That is, the analog-to-digital converter samples the measurement signal amplified by the amplifier. The digital signal obtained by sampling the electrical signal that is based on the reflected light L2 at a predetermined sampling interval in this manner is called a time-series luminance signal. That is, the time-series luminance signal is a series of values obtained by sampling a temporal change of the reflected light L2 at the predetermined sampling interval. The detection circuit 186 supplies the time-series luminance signal to a signal processor 22. The detection circuit 186 may be configured within the signal processor 22. In addition, one detection circuit 186 may be configured for the plural pixels 190*b*.

The signal processor 22 is configured by, for example, a logic circuit including an MPU (Micro Processing Unit) and measures a distance based on a time difference between a timing at which the photodetector 17 detects the laser light L1 and a timing at which the light receiving device 19 detects the reflected light L2.

Figure 7:
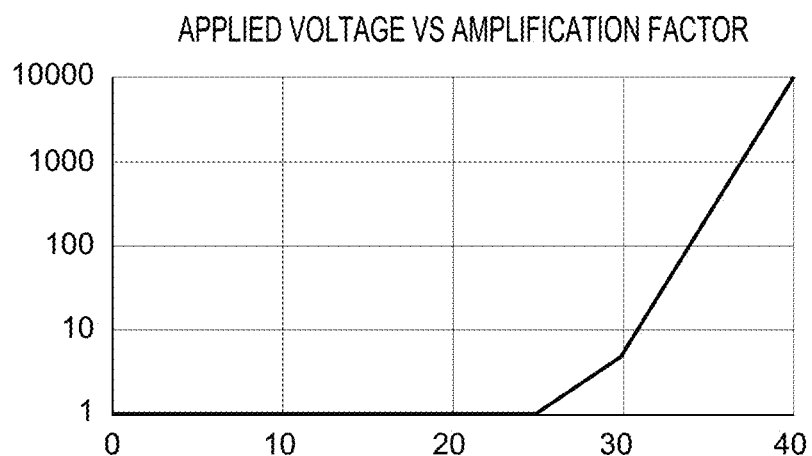
FIG. 7 is a diagram illustrating an example of an amplification factor with respect to a voltage applied to a PD.

FIG. 7 is a diagram illustrating an example of an amplification factor with respect to a voltage applied to the PD 180. The horizontal axis represents a voltage applied across two terminals of the PD 180, and the vertical axis represents an amplification factor. As illustrated in FIG. 7, as the amplification factor becomes higher, an SNR (Signal to Noise Ratio) is improved, resulting in improvement of the device performance. However; when a high voltage is simply applied, power consumption is increased.

Therefore, for example, a light receiver applied voltage is set to a range represented in FIG. 8 in the present embodiment. FIG. 8 is a table representing an example of a reverse bias voltage of the reverse bias power supply 182, a voltage of the distance-measuring-portion side power supply 1900, and a light receiver applied voltage applied across both ends of the PD 180. Accordingly, the reverse bias power supply 182 applies a reverse bias voltage of, for example, −30 volts or −10 volts to one end of the PD 180. Meanwhile, for example, 5 volts or 0 volt is applied to the other end of the PD 180 as the voltage of the distance-measuring-portion side power supply. As described above, in the present embodiment, the voltage across terminals of the PD 180 of the pixel 190*b* used for normal measurement is set to, for example, 35 volts, and the voltage across terminals when no measurement is performed is set to, for example, 10 volts as a range in which power consumption can be reduced.

Referring back to FIG. 7, when the voltage across terminals is set to 10 volts, the amplification factor becomes closer to 0. Accordingly, power consumption of the PD 180 of a non-measurement pixel T1 can be made closer to 0. As described above, the power consumption is reduced by setting the voltage across terminals of the PD 180 of the non-measurement pixel T1 to a low voltage. Further, as for a measurement pixel T3, the switch 184 is set in a connected state, Meanwhile, as for the non-measurement pixel T1, the switch 184 is set in a disconnected state. In the pixels 190*b* according to the present embodiment, a pixel used for measurement is described as the measurement pixel T3, a pixel not used for measurement is described as the non-measurement pixel T1, and a pixel that is ready for measurement is described as a preparing pixel T2.

FIG. 9 is a diagram schematically illustrating an example of distribution of the measurement pixels T3 and the non-measurement pixels T1 in the PDs 180 arranged two-dimensionally. As illustrated in FIG. 9, by switching a voltage applied by the reverse bias power supply 182, a certain pixel 190*b* can be made to serve as the measurement pixel T3 and a certain pixel 190*b* can be made to serve as the non-measurement pixel T1.

FIG. 10 is a block diagram illustrating a more detailed configuration example of the pixel 190*b*. As illustrated in FIG. 10, the pixel 190*b* is configured by elements on a high breakdown voltage side and elements on a low breakdown voltage side. FIG. 10 illustrates the PD 180 and the reverse bias power supply 182, the switch 184, and the distance-measuring-portion side power supply 1900 that correspond to that PD 180. The detection circuit 186 and the signal processor 22 are configured by elements on the low breakdown voltage side because these elements perform, for example, a logical operation. Therefore, the distance-measuring-portion side power supply 1900 is also configured by an element on the low breakdown voltage side.

The reverse bias power supply 182 includes a plurality of DC/DC converters 1860 and 1880, a plurality of capacitors 1900 and 1920, and a switch 194. One end of the capacitor 1900 is connected to the DC/DC converter 1860 and the switch 194, and the other end is connected to one end of the distance-measuring-portion side power supply 1900. One end of the capacitor 1920 is connected to the DC/DC converter 1880 and the switch 194, and the other end is connected to the one end of the distance-measuring-portion side power supply 1900.

The DC/DC converter 1860 outputs a voltage of −10 volts from the ground. Accordingly, charges corresponding to a potential of −10 volts from the ground are stored in the capacitor 1900. Similarly, the DC/DC converter 1880 outputs a voltage of −30 volts from the ground. Accordingly, charges corresponding to a potential of −30 volts from the ground are stored in the capacitor 1920. The switch 194 switches connection between the DC/DC converter 1860 and the PD 180 and connection between the DC/DC converter 1880 and the PD 180, In this case, fluctuation of a switching voltage can be prevented because of the charges stored in the capacitors 1900 and 1920. The switch 194 is, for example, a transistor.

The distance-measuring-portion side power supply 1900 switches 0 volts and 5 volts. The distance-measuring-portion side power supply 1900 is also configured by a plurality of DC/DC converters and a plurality of capacitors, similarly to the reverse bias power supply 182, for example. In this case, the capacitance of the capacitor in the distance-measuring-portion side power supply 1900 is smaller than that in the reverse bias voltage power supply 182. The transistor configuring the switch is also a transistor with a low breakdown voltage. The controller 16 (see FIG. 2) controls the reverse bias power supply 182, the switch 184, and the distance-measuring-portion side power supply 1900.

FIG. 11 is a table representing an operation example of a power-supply voltage in a comparative example. That is, FIG. 11 represents a general example of a reverse bias voltage, a voltage of a distance-measuring-portion side power supply, and a light receiver applied voltage applied across both ends of the PD 180. In the comparative example, the reverse bias voltage is fixed to −30 volts. For example, 0 volt or 5 volts is applied as the voltage of the distance-measuring-portion side power supply 1900. In this case, 30 volts is applied across terminals of the PD 180 even when the voltage of the distance-measuring-portion side power supply 1900 is set to, for example, 0 volt, Therefore, the PD 180 inevitably maintains a multiplication factor of several times (see FIG. 7). If the distance-measuring-portion side power supply 1900 when no measurement is performed can be set to −20 volts, the voltage across terminals of the PD 180 can be reduced to about 10 volts. However, the distance-measuring-portion side power supply 1900 is arranged on the low breakdown voltage side, and change of the voltage from 0 volt to −20 volts is difficult to achieve. As is understood from the above descriptions, in order to change the voltage across terminals by about 20 volts, adjustment has to be performed by a power supply for circuits on the high breakdown voltage side, that is, the reverse bias power supply 182.

FIG. 12 is a table representing an operation example of a power-supply voltage including a preparing operation by the controller 16 (see FIG. 2). That is, FIG. 12 represents an example of a reverse bias voltage, a voltage of the distance-measuring-portion side power supply 1900, and a light receiver applied voltage (a voltage across terminals) applied across both ends of the PD 180. As described above, the pixels 190b have the preparing pixel T2 (a pixel for which measurement is to be performed next) as a pixel in an intermediate operating state between the measurement pixel T3 and the non-measurement pixel T1. In the preparing pixel T2, the reverse bias voltage is set to −30 volts, and the voltage of the distance-measuring-portion side power supply 1900 is set to, for example, 0 volt, thereby setting the light receiver applied voltage to 30 volts. In the measurement pixel T3, the switch 184 is set in a connected state. Meanwhile, in the non-measurement pixel T1 and the preparing pixel T2, the switch 184 is set in a disconnected state. Further, by setting the preparing pixel 12 for which next measurement is performed to an intermediate voltage as represented in FIG. 12, a response time required for voltage control can be shortened. Therefore, the constraint on the response speeds of the DC/DC converters 1860 and 1880 (see FIG. 10) can be relaxed.

FIG. 13 is a diagram illustrating an example of distribution of the measurement pixels T3, the preparing pixels T2, and the non-measurement pixels T1 in the PDs 180 arranged two-dimensionally. As illustrated in FIG. 13, a certain pixel 190b can be set to any of the measurement pixel T3, the preparing pixel 12, and the non-measurement pixel T1 by switching a combination of voltages applied by the reverse bias power supply 182 and the distance-measuring-portion side power supply 1900 by driving control executed by the controller 16.

FIG. 14 is a diagram schematically illustrating a time change of driving states of pixels in three columns. An arrow G18 represents pixels in three columns and the horizontal axis represents time. As illustrated in FIG. 14, the positions of the measurement pixel T3, the preparing pixel T2, and the non-measurement pixel T1 can be changed in accordance with time change of the position of an object of image capturing, for example. As described above, by driving control executed for the light receiving device 19 by the controller 16, the positions of the measurement pixel T3, the preparing pixel T2, and the non-measurement pixel T1, for example, can also be changed over time.

Figure 15:
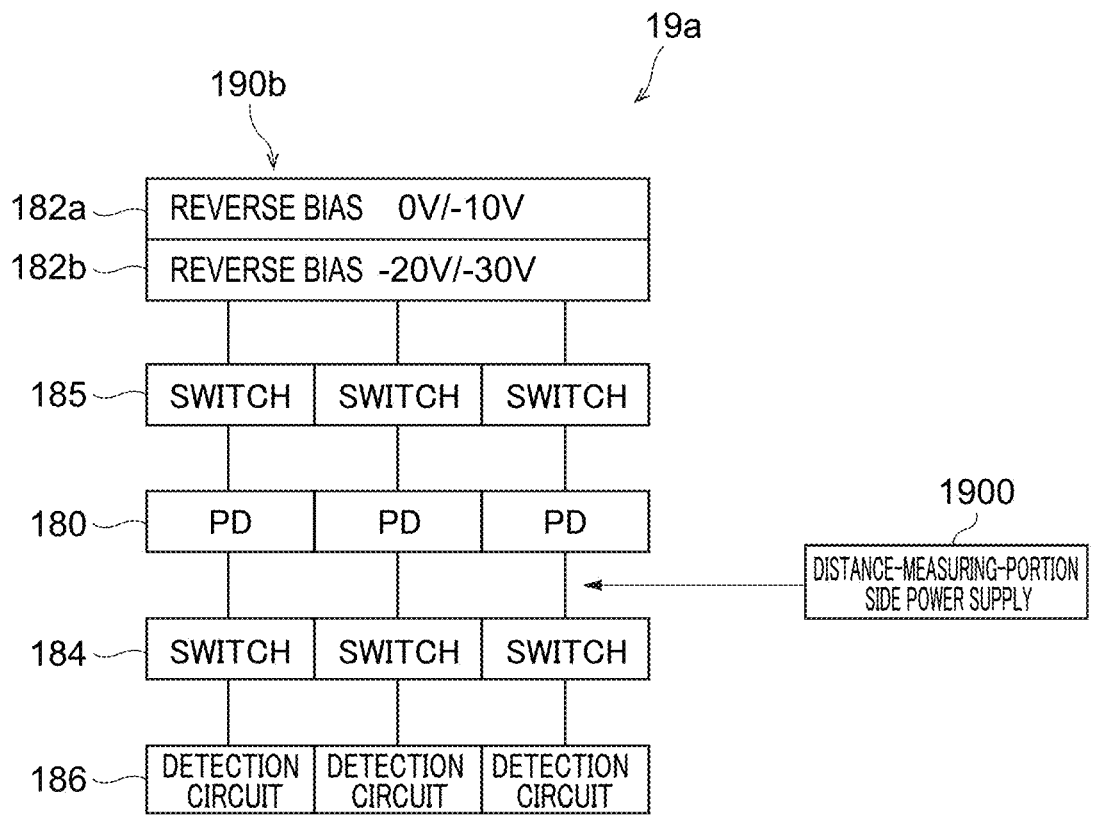
FIG. 15 is a block diagram illustrating a configuration example of a light receiving device including a plurality of reverse bias voltages.

FIG. 15 is a block diagram illustrating a configuration example of a light receiving device 19a, As illustrated in FIG. 15, the light receiving device 19a is different from the light receiving device 19 illustrated in FIG. 6 in including a plurality of reverse bias power supplies 182a and 182b, and switches 185 each connect or disconnect the reverse bias power supplies 182a and 182b and the PD 180. The reverse bias power supply 182a can switch, for example, 0 volt and −10 volts. The reverse bias power supply 182b can switch, for example, −20 volts and −30 volts. With this configuration, a reverse bias voltage of 0 volt, −10 volts, −20 volts, and −30 volts can be applied to each PD 180. As described above, a plurality of reverse bias voltages may be prepared and configured to be selectable by the switch 185 for each pixel.

Figure 16:
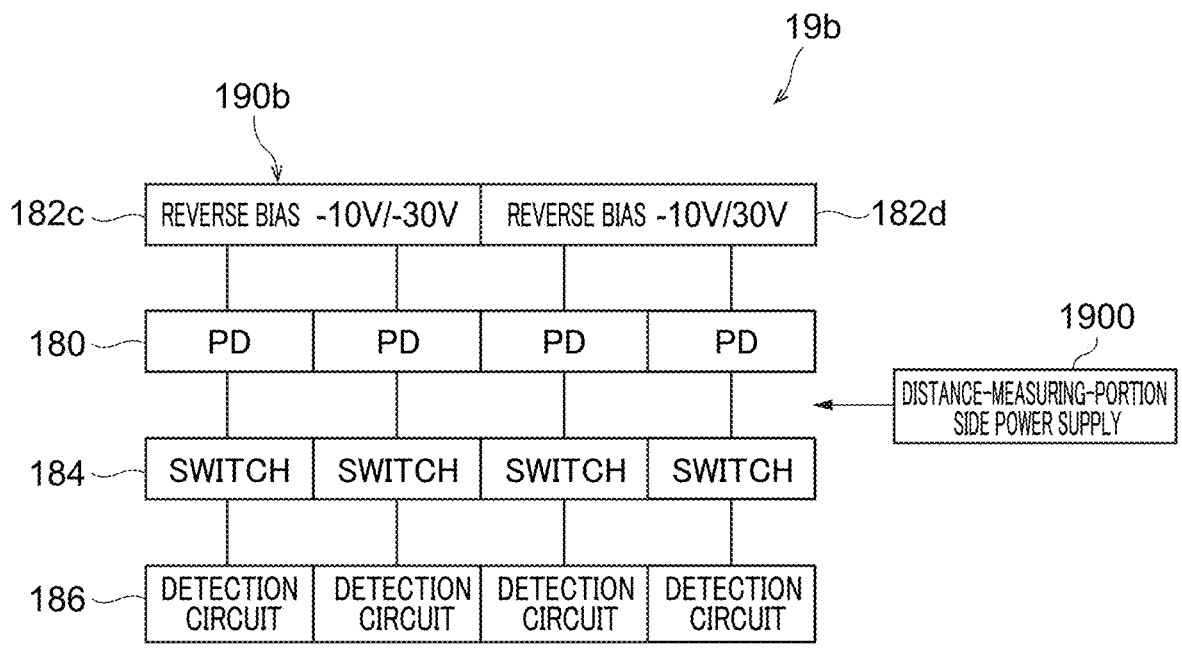
FIG. 16 is a block diagram illustrating a configuration example of a light receiving device in which reverse bias power supplies are connected to the plural PDs.

FIG. 16 is a block diagram illustrating a configuration example of a light receiving device 19b. As illustrated in FIG. 16, the light receiving device 19b is different from the light receiving device 19 illustrated in FIG. 6 in that reverse bias power supplies 182c and 182d are connected to the plural PDs 180. The reverse bias power supplies 182c and 182d can switch, for example, −10 volts and −30 volts. Accordingly, a bias voltage can be switched for each set of the PDs 180 in the light receiving device 19b.

Figure 17:
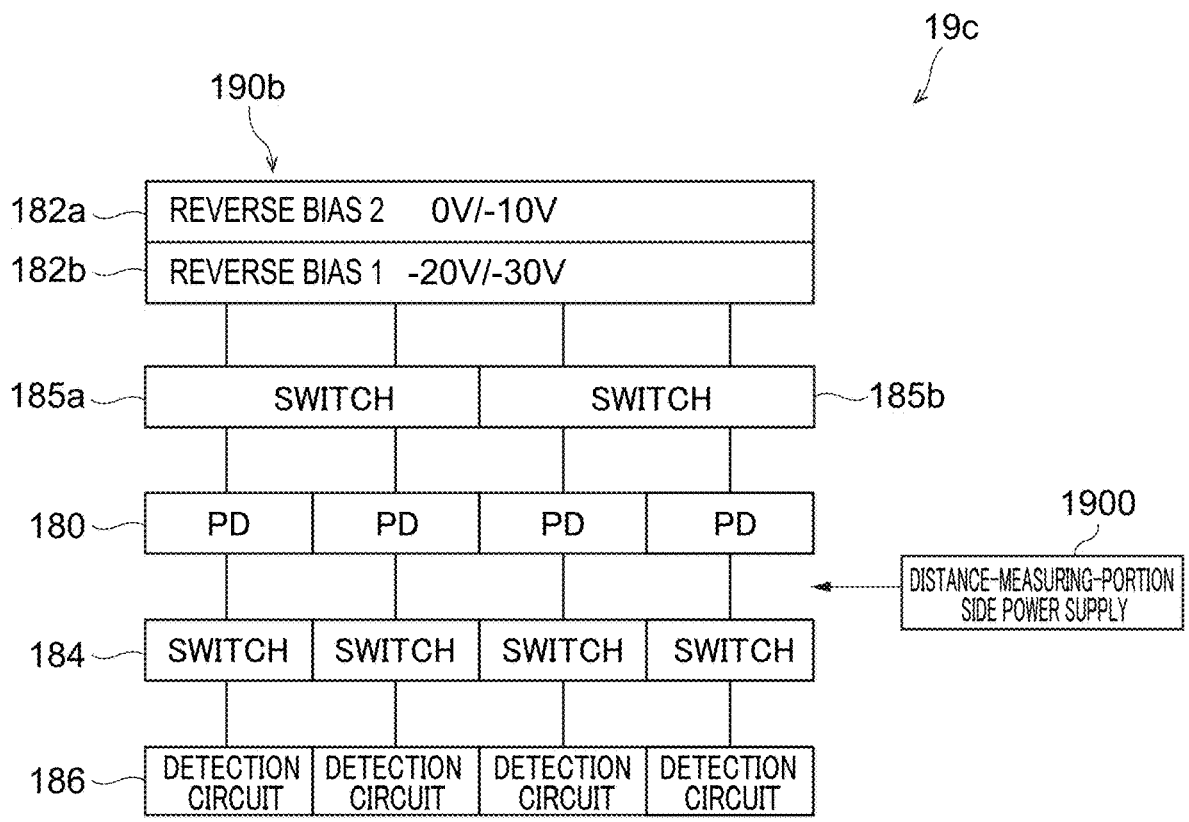
FIG. 17 is a diagram illustrating a configuration example of a light receiving device in which a reverse bias voltage can be applied to each set of the plural PDs.

FIG. 17 is a block diagram illustrating a configuration example of a light receiving device 19c. As illustrated in FIG. 17, in the light receiving device 19c, the reverse bias power supplies 182a and 182b and the PDs 180 are connected to each other via switches 185a and 185b. The switches 185a and 185b each select either of the reverse bias power supplies 182a and 182b, The reverse bias power supply 182a can switch, for example, 0 volt and −10 volts. The reverse bias power supply 182b can switch, for example, −20 volts and −30 volts. With this configuration, a reverse bias voltage of 0 volt, −10 volts, −20 volts, and −30 volts can be applied to each set of the PDs 180. As described above, a plurality of reverse bias voltages may be prepared and configured to be selectable by the switches 185a and 185b for each set of pixels.

Figure 18:
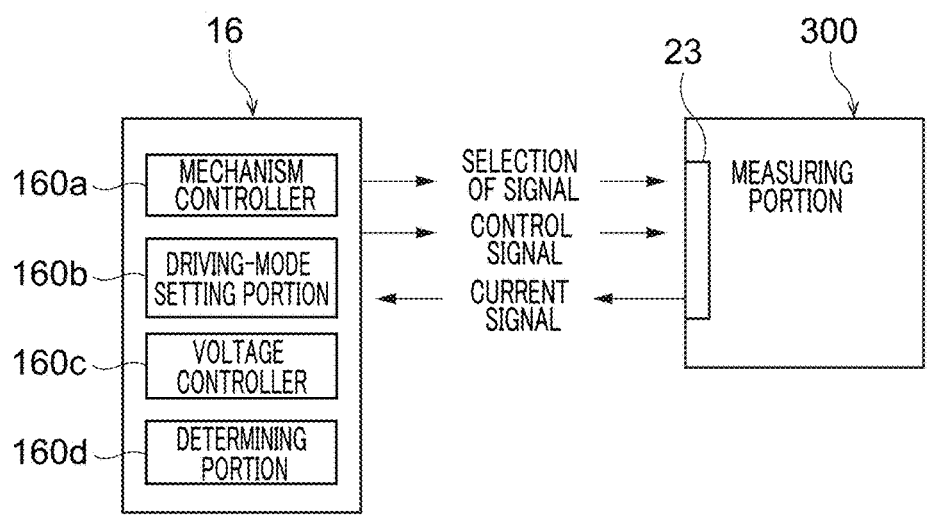
FIG. 18 is a block diagram illustrating a configuration example of the controller.

FIG. 18 is a block diagram illustrating a configuration example of the controller 16. As illustrated in FIG. 18, the controller 16 includes a mechanism controller 160a, a driving-mode setting portion 160b, a voltage controller 160c, and a determining portion 160d. As described above, the mechanism controller 160a controls the oscillator 11a and the second driving circuit 16b to control a position to be irradiated with laser light and an irradiation timing. An input and output portion (IF) 23 has a decoder function and a function of serial to parallel conversion. Accordingly, a signal encoded by the controller 16 and a signal obtained by serial conversion can be decoded or converted to a parallel signal.

Figure 19:
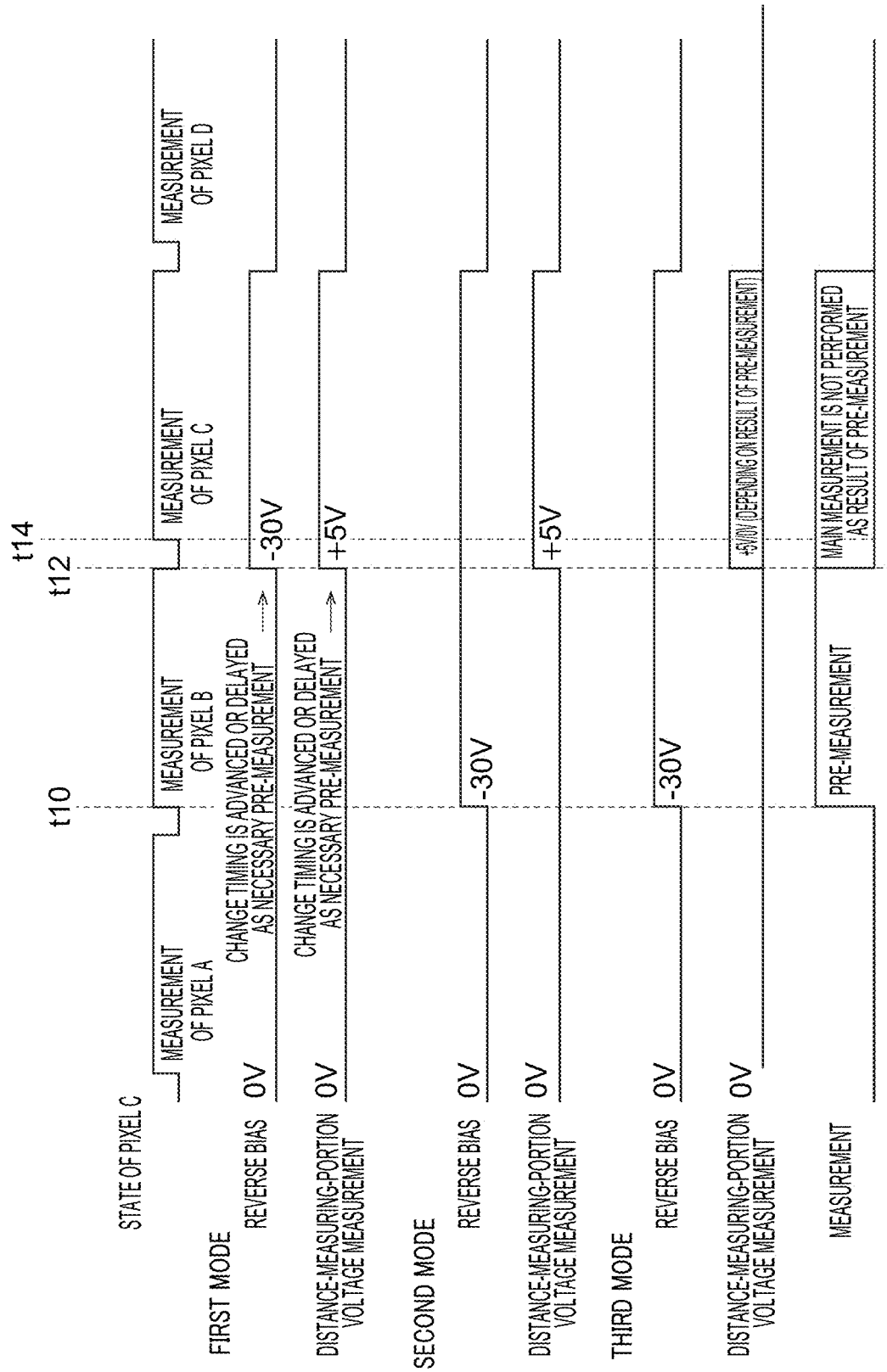
FIG. 19 is a time chart illustrating a control example in each mode.

The voltage controller 160c controls a voltage to be applied to the PD 180 and connection and disconnection of the PD 180. The driving-mode setting portion 160b sets an operating state of the PD 180. The driving-mode setting portion 160b sets, for example, any of a first mode, a second mode, and a third mode. For example, the driving-mode setting portion 160b sets each mode based on a control instruction from a higher-order device such as the driver assistance device 500 (see FIG. 1), FIG. 19 is a time chart illustrating a control example in each mode. From top to bottom are illustrated a pixel driving signal, a reverse bias voltage and a distance-measuring-portion voltage in the first mode in a pixel C (190b), a reverse bias voltage and a distance-measuring-portion voltage in the second mode in the pixel C, a reverse bias voltage and a distance-measuring-portion voltage in the third mode in the pixel C, and the type of measurement. The horizontal axis represents time.

The pixel driving signal indicates driving timings of the respective PDs 180 arranged on one line as illustrated in FIG. 4, by a high level. For example, driving timings of the respective PDs 180 of pixels A to D are indicated by a high level. That is, the PDs 180 are driven in accordance with a position at which the reflected laser light L2 is received.

Here, the first mode, the second mode, and the third mode are described, referring to driving of the pixel C in a scanning method as an example. The first mode is a mode in which driving is changed in time series to drive the pixel C as the measurement pixel T3 from the non-measurement pixel T1, That is, in the first mode, the voltage controller 160c sets the reverse bias voltage to −30 volts and the distance-measuring-portion voltage to 5 volts at a timing t12 at which driving of the adjacent PD 180 (the pixel B) ends, thereby driving the pixel C as the measurement pixel T3.

The second mode is a mode in which driving is changed in time series to drive the pixel C as the non-measurement pixel T1, the preparing pixel T2, and the measurement pixel T3 in that order, That is, in the second mode, the voltage controller 160c sets the reverse bias voltage to −30 volts at a timing t10 at which driving of the adjacent PD 180 (the pixel B) starts, thereby driving the pixel C as the preparing pixel T2 from the non-measurement pixel T1. The voltage controller 160c then sets the distance-measuring-portion voltage to 5 volts at the timing t12 at which driving of the adjacent PD 180 ends, thereby driving the pixel C as the measurement pixel T3 from the preparing pixel T2.

The third mode is a mode in which main measurement is performed when the result of pre-measurement indicates that sunlight or the like is not incident. That is, in the third mode, the voltage controller 160c sets the reverse bias voltage to −30 volts at the timing t10 at which driving of the adjacent PD 180 (the pixel B) starts, thereby driving the pixel C as the preparing pixel T2. Although normal measurement is difficult when a voltage across terminals of the PD 180 is 30 volts, the PD 180 can perform multiplication in a case where there is a large amount of light, such as sunlight. Accordingly, power consumption is reduced. The determining portion 160d determines that the PD 180 of the pixel C is receiving sunlight when that PD 180 generates a current equal to or larger than a predetermined current value in pre-measurement.

In the third mode, when the determining portion 160d determines that sunlight is received, main measurement is not performed even at a timing t14 of start of measurement of the pixel C and maintains the distance-measuring-portion voltage to 0 volt. Accordingly, power consumption is reduced. In this case, the voltage controller 160c may set the reverse bias voltage to 0 volt at the end timing t12 of the measurement of the pixel B, thereby changing the pixel C to the measurement pixel T3 from the preparing pixel 12. Accordingly, power consumption is further reduced.

Figure 20:
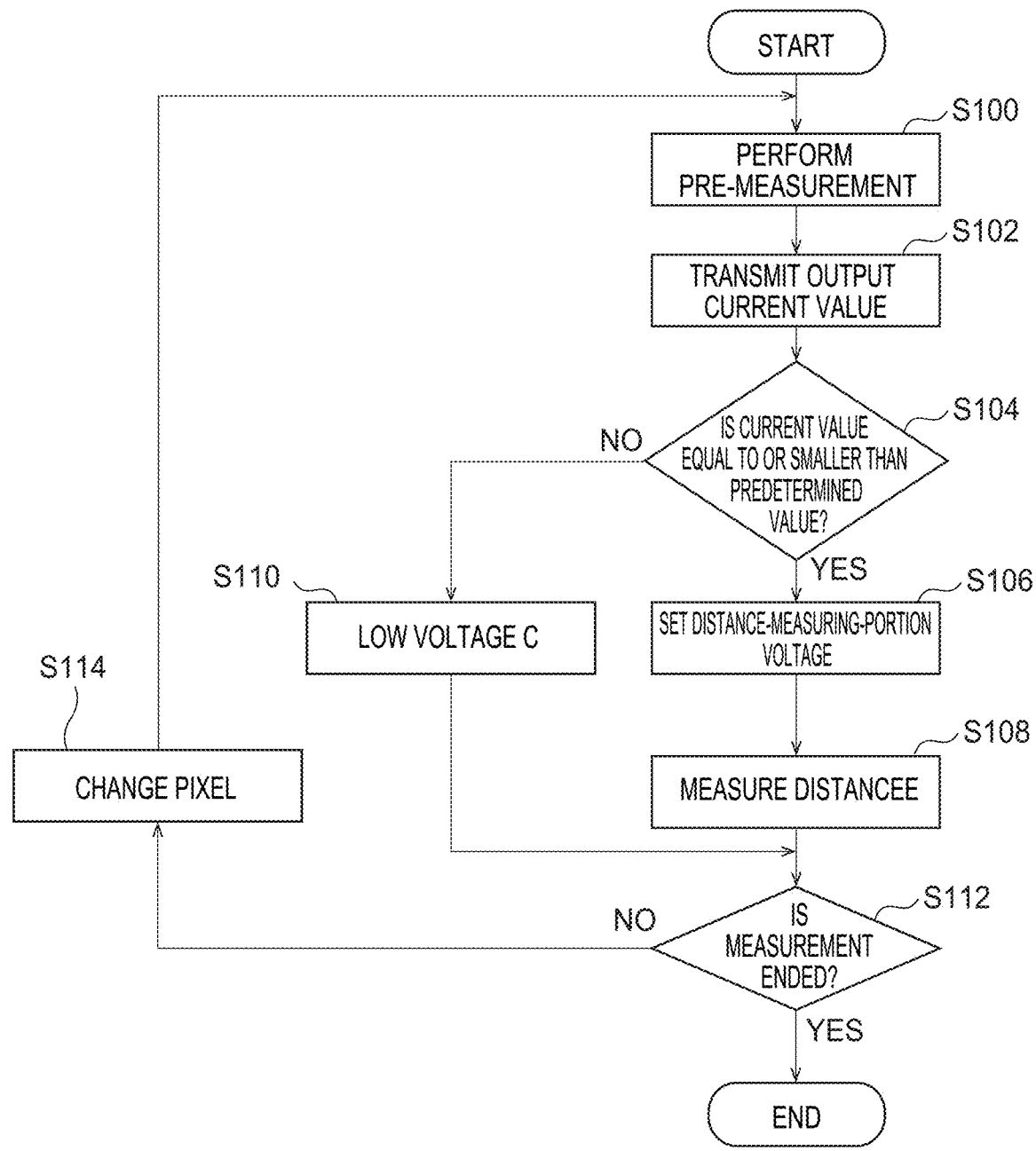
FIG. 20 is a flowchart illustrating a processing example in a third mode.

FIG. 20 is a flowchart illustrating a processing example in the third mode, Driving of a pixel in a scanning method is described as an example, with reference to FIG. 19. First, the driving-mode setting portion 160b of the controller 16 sets the third mode and drives the PD 180 as the preparing pixel T2 with a reverse bias voltage set to −30 volts at the timing t10 at which driving of the adjacent PD 180 starts, thereby performing pre-measurement (Step S100).

Next, a value of a current generated by the PD 180 is transmitted to the determining portion 160d (Step S102). The determining portion 160d then determines whether the current value is equal to or smaller than a predetermined value (Step S104). When the current value is equal to or smaller than the predetermined value (Y at Step S104), the determining portion 160d controls the voltage controller 160c to set a distance-measuring-portion voltage to 5 volts and drive the PD 180 as the measurement pixel T3 from the preparing pixel T2 (Step S106).

Subsequently, the signal processor 22 (see FIG. 2) generates a distance value based on a time difference between a peak timing of a signal from a pixel driven as the measurement pixel T3 and an emission timing of measurement light (Step S108). Meanwhile, when the current value is equal to or larger than the predetermined value (N at Step S104), the determining portion 160d controls the voltage controller 160c to set the reverse bias voltage to 0 volt and drive the PD 180 as the non-measurement pixel T1 from the preparing pixel T2 (Step S110). The signal processor 22 (see FIG. 2) does not perform signal processing with regard to a pixel driven as the non-measurement pixel T1 and generates, for example, a null value (NULL) as the distance value.

The driving-mode setting portion 160b determines whether measurement has been performed for all pixels (Step S112), and ends processing in the third mode when determining that measurement has been performed for all pixels (Y at Step S112). Meanwhile, when not determining that measurement for all pixels has been performed (N at Step S112), the driving-mode setting portion 160b changes an object to be driven to the next pixel and repeats the processes from Step S100.

As described above, when the current value is equal to or larger than the predetermined value in pre-measurement, the driving-mode setting portion 160b executes control to lower a voltage across terminals of a target pixel to a level of the non-measurement pixel T1. Accordingly, power consumption of the target pixel can be reduced because, when the current value is equal to or larger than the predetermined value, sunlight or the like is incident on the target pixel and normal distance measurement cannot be performed.

As described above, according to the present embodiment, a configuration is employed in which a voltage applied across both ends of the PD 180 can be changed for each pixel 190b, This configuration can reduce power consumption of the pixel 190b not used for measurement, such as the preparing pixel T2 and the non-measurement pixel T1 as compared to that of the measurement pixel T3, so that power consumption of the light receiving device 19 can be reduced.

Second Embodiment

The driver assistance system 1 according to a second embodiment is different from the driver assistance system 1 according to the first embodiment in that a voltage across terminals is changed in accordance with change of the characteristics of the PD 180 caused by temperature change of the light receiving devices 19. Differences between the driver assistance system 1 according to the second embodiment and the driver assistance system 1 according to the first embodiment are described below.

Figure 21:
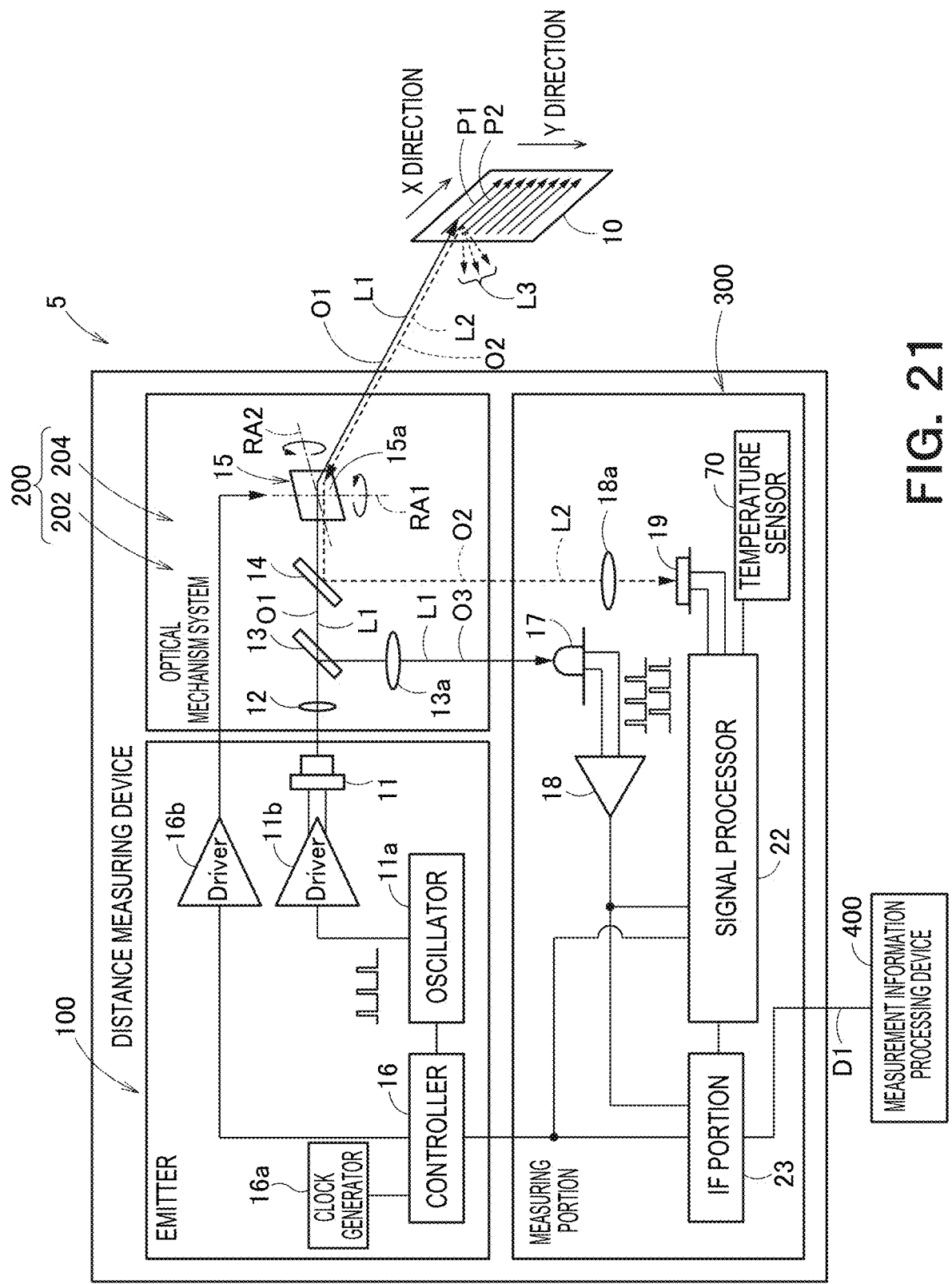
FIG. 21 is a block diagram illustrating a configuration example of a distance measuring device according to a second embodiment.

FIG. 21 is a block diagram illustrating a configuration example of the distance measuring device 5 according to the second embodiment. The distance measuring device 5 according to the second embodiment is different from the distance measuring device 5 according to the first embodiment in further including a temperature sensor 70. The temperature sensor 70 is arranged near the PD 180 of the light receiving device 19, and measures an environmental temperature of the PD 180 and transmits it to the controller 16. The driving-mode setting portion 160b of the controller 16 sets a high-temperature mode in which a voltage across terminals is increased from that in a normal mode by, for example, 3 volts, when the environmental temperature is equal to or higher than a predetermined temperature (for example, 30° C.). Meanwhile, the driving-mode setting portion 160b sets the normal mode in which the voltage across terminals is lower than that in the high-temperature mode by, for example, 3 volts when the environmental temperature is lower than the predetermined temperature.

Figure 22:
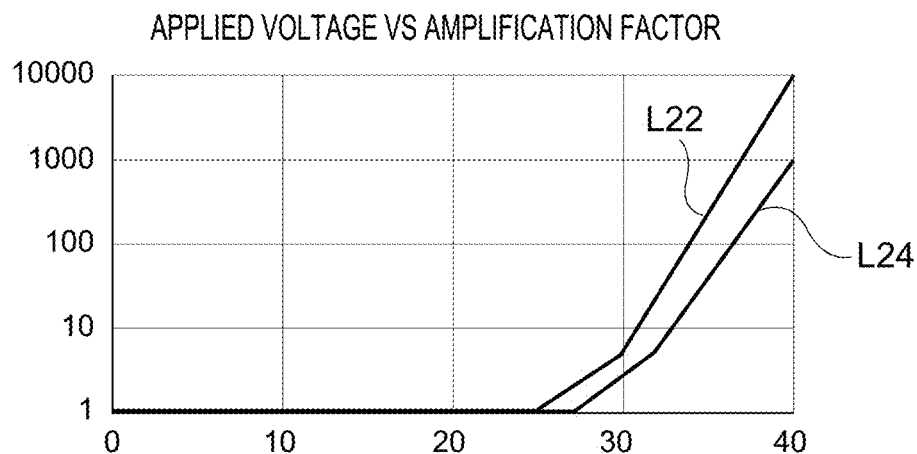
FIG. 22 is a diagram illustrating temperature characteristics of a multiplication factor with respect to an applied voltage.
Figure 23:
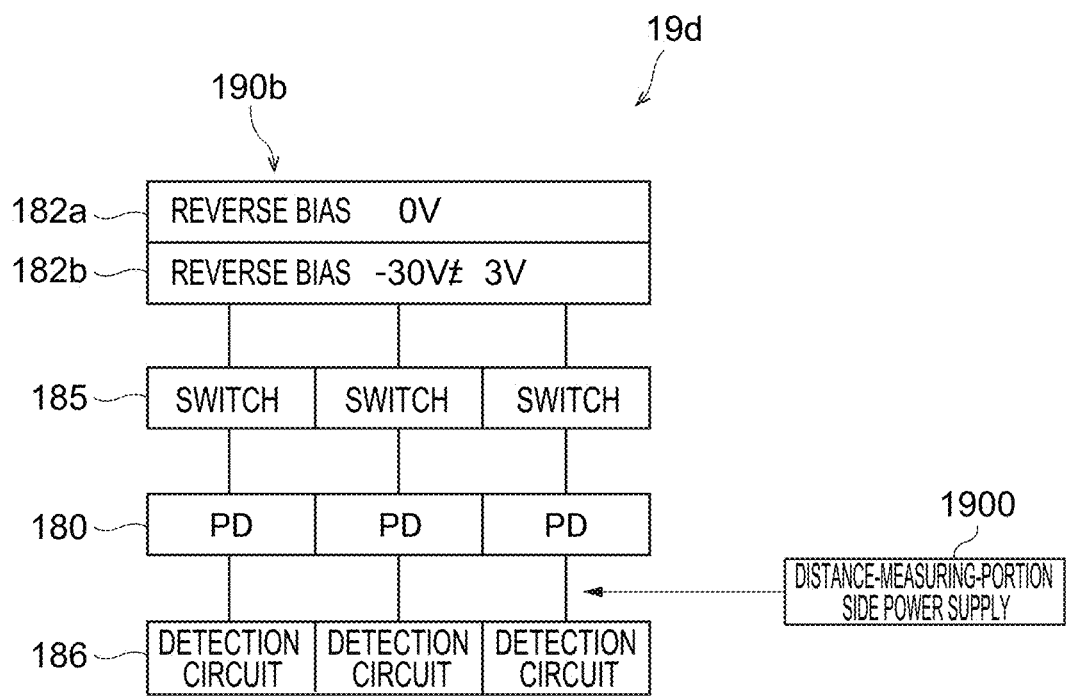
FIG. 23 is a diagram of a configuration example of a light receiving device, in which a reverse bias voltage can be changed to −30 volts±3 volts.

FIG. 22 illustrates temperature characteristics of a multiplication factor with respect to an applied voltage. The horizontal axis represents a voltage across terminals (an applied voltage), and the vertical axis represents a multiplication factor. A line L22 represents characteristics at a low temperature, and a line L24 represents characteristics at a high temperature. As illustrated, the multiplication factor becomes lower as the temperature becomes higher. Therefore, control to increase the voltage across terminals with temperature increase is executed in the present embodiment, FIGS. 23 to 27 are diagrams illustrating examples of the light receiving device 19 configured to allow the driving-mode setting portion 160b to change a voltage across terminals of the PD 180. FIG. 23 is a diagram of a configuration example of a light receiving device 19d, in which a reverse bias voltage can be changed to −30 volts±3 volts. That is, the light receiving device 19d is different from the light receiving device 19c illustrated in FIG. 17 in that the switch 184 is omitted and voltage settings of the reverse bias power supplies 182a and 182b are changed. That is, in the light receiving device 19d, the reverse bias voltage can be changed to 0 volt and −30 volts±3 volts. Accordingly, the reverse bias voltage can be set to −33 volts in a high-temperature mode and to −30 volts or −27 volts in a normal mode.

Figure 24:
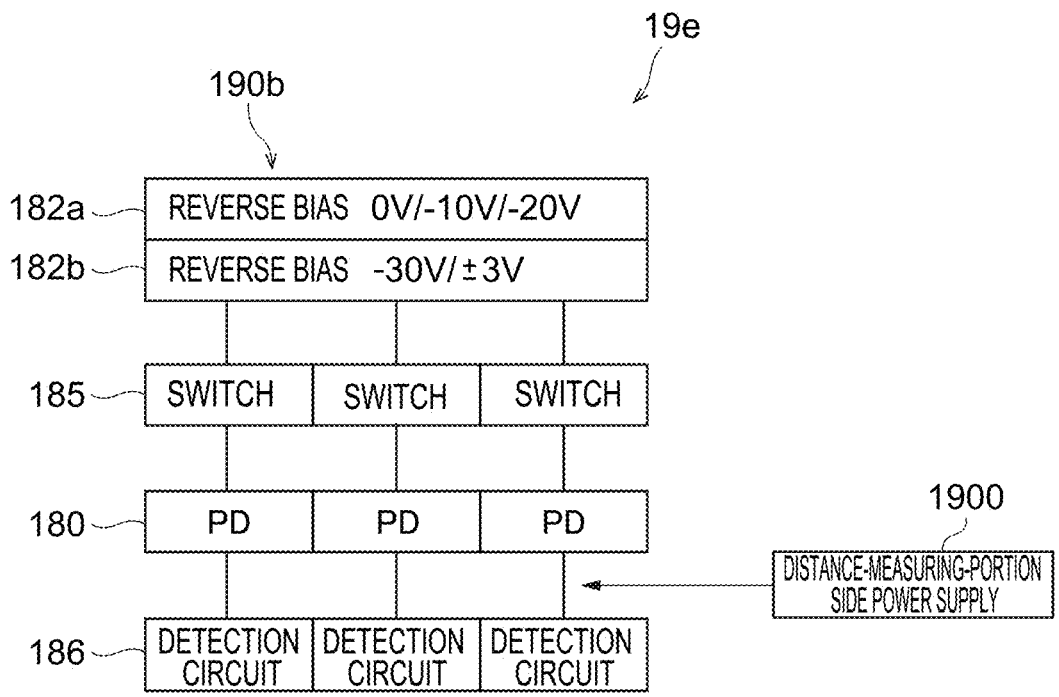
FIG. 24 is a diagram of a configuration example of a light receiving device, in which a reverse bias voltage can be further changed.
Figure 25:
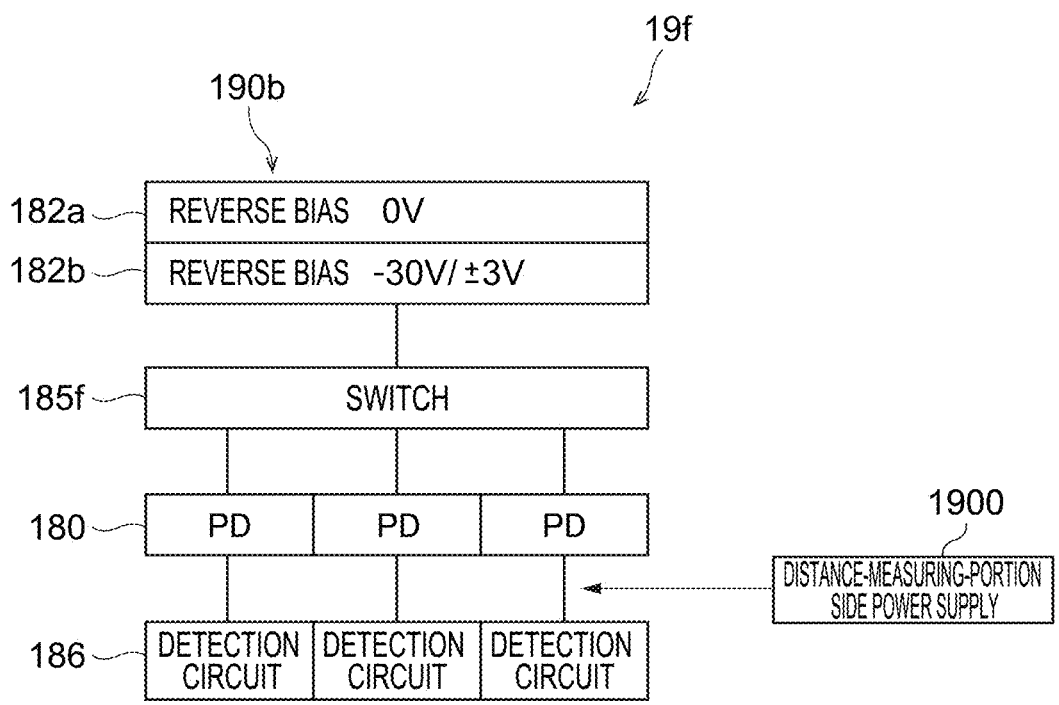
FIG. 25 is a diagram of a configuration example of a light receiving device, in which a reverse bias voltage can be changed to −30 volts±3 volts for the plural PDs.

FIG. 24 is a diagram illustrating a configuration example of a light receiving device 19e, in which a reverse bias voltage can be further changed to −10 volts and −20 volts. That is, as compared to the light receiving device 19d illustrated in FIG. 23, the reverse bias voltage can be further changed to −10 volts and −20 volts, FIG. 25 is a diagram illustrating a configuration example of a light receiving device 19f, in which a reverse bias voltage can be changed to −30 volts±3 volts for the plural PDs 180. The light receiving device 19f is different from the light receiving device 19d illustrated in FIG. 23 in that the reverse bias voltage can be changed to −30 volts±3 volts for the plural PDs 180.

Figure 26:
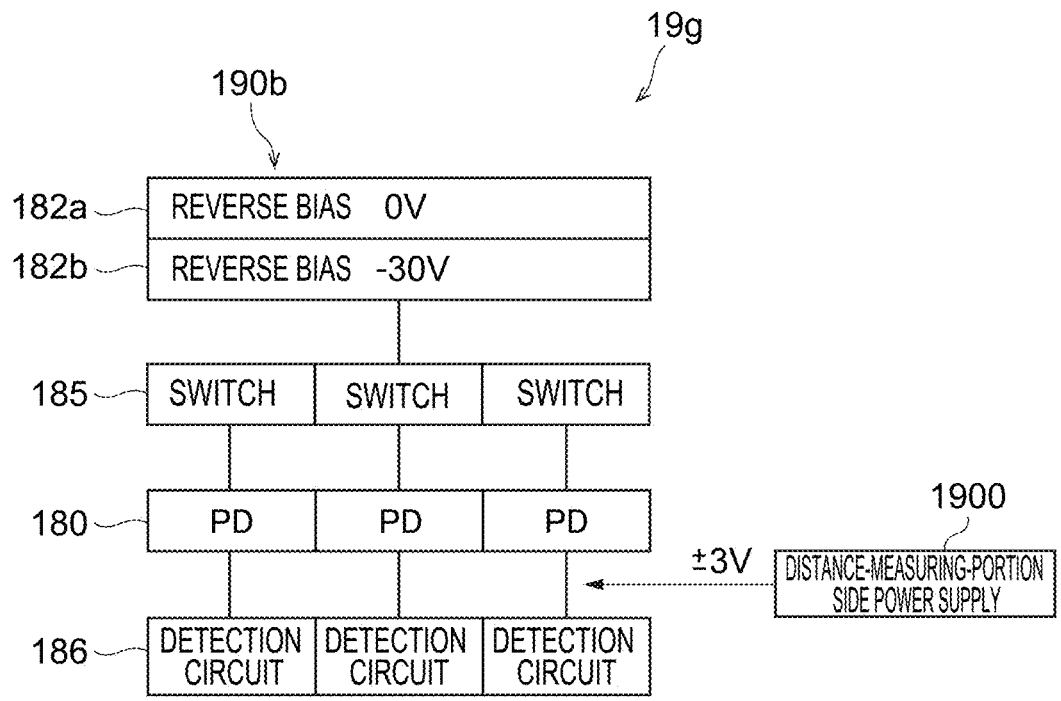
FIG. 26 is a diagram of a configuration example of a light receiving device, in which a voltage of a distance-measuring-portion side power supply can be changed.
Figure 27:
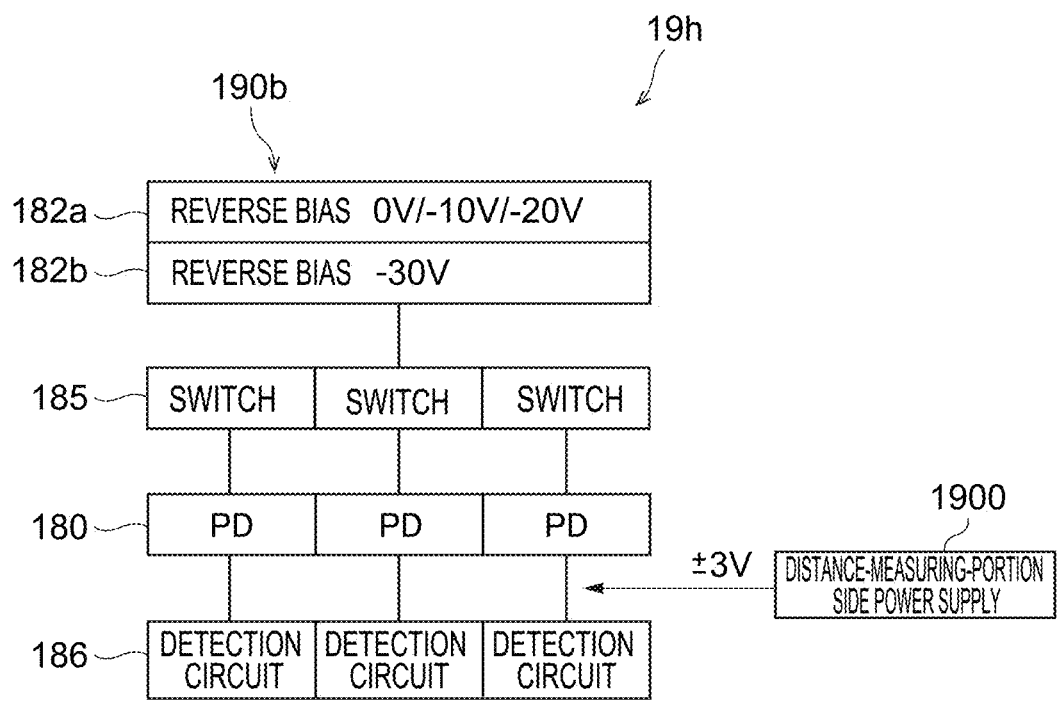
FIG. 27 is a diagram of a configuration example of a light receiving device, in which a voltage of the distance-measuring-portion side power supply can be changed by ±3 volts.

FIG. 26 is a diagram of a configuration example of a light receiving device 19g, in which a voltage of the distance-measuring-portion side power supply 1900 can be changed by ±3 volts. The light receiving device 19g is different from the light receiving device 19d illustrated in FIG. 23 in that the voltage of the distance-measuring-portion side power supply 1900 can be changed by ±3 volts for the PD 180. Accordingly, for example, the voltage of the distance-measuring-portion side power supply 1900 can be set to 8 volts in a high-temperature mode and to 5 volts or 2 volts in a normal mode, FIG. 27 is a diagram illustrating a configuration example of a light receiving device 19h, in which a voltage of the distance-measuring-portion side power supply 1900 can be changed by ±3 volts. The light receiving device 19h is different from the light receiving device 19e illustrated in FIG. 24 in that the voltage of the distance-measuring-portion side power supply 1900 can be changed by ±3 volts for the PD 180. Accordingly, for example, the voltage of the distance-measuring-portion side power supply 1900 can be set to 8 volts in a high-temperature mode and to 5 volts or 2 volts in a normal mode.

Figure 28:
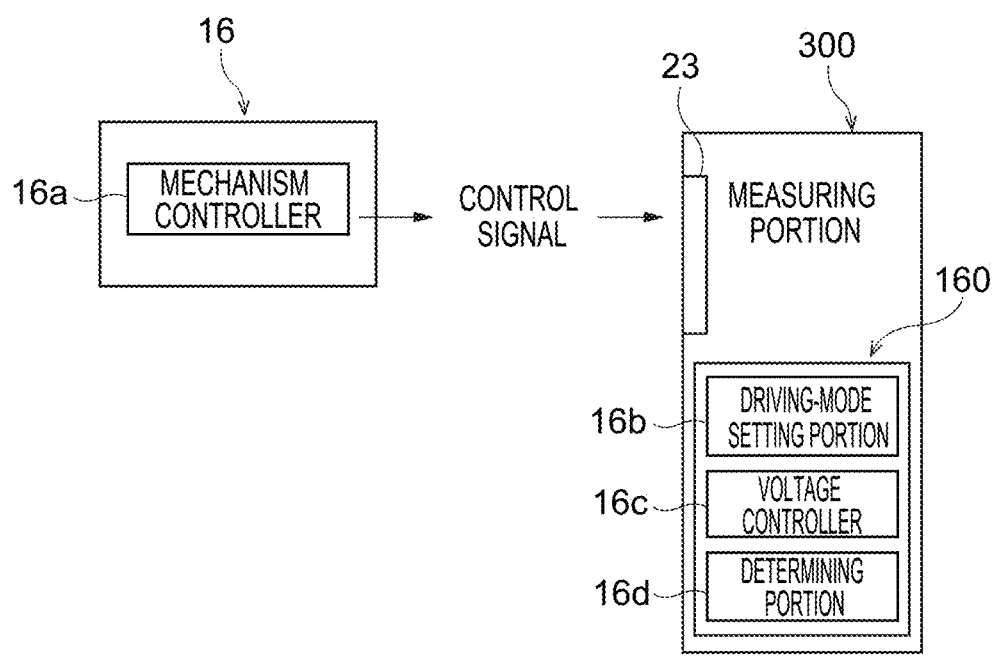
FIG. 28 is a block diagram illustrating an example in which a second controller is provided in a measuring portion.

FIG. 28 is a block diagram illustrating an example in which a second controller 160 is provided in the measuring portion 300, The distance measuring device 5 according to the second embodiment is different from the distance measuring device 5 according to the first embodiment in that the second controller 160 is provided in the measuring portion 300. That is, the driving-mode setting portion 160b, the voltage controller 160c, and the determining portion 160d are provided in the second controller 160 in the measuring portion 300. Accordingly, the measuring portion 300 can perform a control operation only by receiving a control signal for linking control of the oscillator 11a and control of the second driving circuit 16b (see FIG. 2) to each other. Therefore, communication processing can be more simplified.

As described above, according to the present embodiment, a voltage across terminals of the PD 180 is changed in accordance with change of the characteristics of the PD 180 caused by change of the temperature of any of the light receiving devices 19d to 19h, Accordingly, even in a case where the characteristics of the PD 180 have temperature dependency, power control can be executed in accordance with the measurement accuracy, and power consumption of the light receiving device can be reduced.

While certain embodiments have been described, these embodiments have been presented by way of example only, and are not intended to limit the scope of the inventions. Indeed, the novel embodiments described herein may be embodied in a variety of other forms and various omissions, substitutions, and changes may be made without departing from the spirit of the inventions. The embodiments and their modifications are intended to be included in the scope and the spirit of the invention and also in the scope of the invention and their equivalents described in the claims.

The invention claimed is:

1. A distance measuring device comprising:
a light receiving device including a plurality of pixels; and
a processor configured to control the light receiving device,
wherein
each of the pixels comprises:
a photoelectric conversion element that detects incidence of a photon;
a first power supply configured to supply a voltage to an anode side of the photoelectric conversion element for each pixel; and
a second power supply configured to supply a voltage to a cathode side of the photoelectric conversion element for each pixel or each pixel group including one or more pixels,
the voltage of the first power supply is changeable independently for each photoelectric conversion element, and
the processor is configured to control at least one of the first power supply and the second power supply, to control voltage between terminals of the photoelectric conversion elements so that the voltage between terminals of the photoelectric conversion elements is lowered in the order of a measurement pixel used for normal measurement, a preparing pixel that performs multiplication when a light intensity exceeds a predetermined level, and a non-measurement pixel that is not used for measurement.

2. The distance measuring device of claim 1, wherein the processor makes a fluctuation range of the voltage of the first power supply larger than a fluctuation range of the voltage of the second power supply.

3. The distance measuring device of claim 1, wherein the processor makes the fluctuation range of the voltage of the first power supply smaller than the fluctuation range of the voltage of the second power supply.

4. The distance measuring device of claim 1, wherein the photoelectric conversion element is a photodiode.

5. The distance measuring device of claim 1, wherein the voltage of the first power supply and the voltage of the second power supply are changeable independently for each pixel or each pixel group including one or more pixels.

6. The distance measuring device of claim 2, wherein the first power supply supplies the voltage to the photoelectric conversion element included in each of the pixels.

7. The distance measuring device of claim 2, wherein the processor makes an absolute value of the applied voltage in a measurement state larger than the applied voltage in a non-measurement state.

8. The distance measuring device of claim 2, wherein the pixel is configured by elements on a high breakdown voltage side and elements on a low breakdown voltage side, the first power supply is one of the elements on the high breakdown voltage side, and the second power supply is one of the elements on the low breakdown voltage side.

9. The distance measuring device of claim 6, wherein the processor sets each of the pixels in the measurement state in accordance with a magnitude of an output signal that is based on the photoelectric conversion element in the non-measurement state.

10. The distance measuring device of claim 7, wherein the processor changes a magnitude of the applied voltage in the non-measurement state in at least two steps.

11. The distance measuring device of claim 9, wherein the processor sets each of the pixels in the measurement state when the output signal is smaller than a predetermined value.

12. The distance measuring device of claim 9, wherein the processor changes a magnitude of the applied voltage in accordance with a temperature of the photoelectric conversion element.

13. The distance measuring device of claim 12, wherein the processor makes the magnitude of the applied voltage larger with increase of the temperature of the photoelectric conversion element.

14. The distance measuring device of claim 13, further comprising:
a first optical element that irradiates a measurement object with laser light while changing an emission direction of the laser light; and
a second optical element that receives reflected light of the laser light irradiated by the first optical element,
wherein the light receiving device converts the reflected light received through the second optical element to an electrical signal.

15. The distance measuring device of claim 14, wherein the photoelectric conversion element is a Geiger-mode avalanche photodiode.

* * * * *